(12) United States Patent
La Banco et al.

(10) Patent No.: US 11,040,464 B2
(45) Date of Patent: Jun. 22, 2021

(54) CUTTING MACHINE WITH A LIQUID LUBRICATION DELIVERY SYSTEM HAVING A CONTROLLED LIQUID LEVEL

(75) Inventors: Sam La Banco, Northbrook, IL (US); Michael Reedy, Chicago, IL (US); Elmer Vavricek, Gardner, KS (US); Timothy Vette, Olathe, KS (US); Johan Andersson, Bollebygd (SE); Karl Elmestrand, Sävedalen (SE)

(73) Assignee: HUSQVARNA AB, Huskvarna (SE)

( * ) Notice: Subject to any disclaimer, the term of this patent is extended or adjusted under 35 U.S.C. 154(b) by 380 days.

(21) Appl. No.: 13/236,547

(22) Filed: Sep. 19, 2011

(65) Prior Publication Data

US 2012/0118278 A1 May 17, 2012

Related U.S. Application Data

(63) Continuation-in-part of application No. PCT/US2010/027691, filed on Mar. 17, 2010, which is a continuation of application No. PCT/US2009/037352, filed on Mar. 17, 2009.

(51) Int. Cl.
| | |
|---|---|
| *B28D 7/02* | (2006.01) |
| *B23D 59/02* | (2006.01) |
| *B23D 47/02* | (2006.01) |
| *B28D 7/04* | (2006.01) |

(52) U.S. Cl.
CPC ............ *B28D 7/02* (2013.01); *B23D 47/025* (2013.01); *B23D 59/02* (2013.01); *B28D 7/04* (2013.01); *Y10T 83/04* (2015.04); *Y10T 83/293* (2015.04)

(58) Field of Classification Search
CPC .... B23D 59/02; B23D 47/025; B23D 59/025; B28D 7/02; B28D 1/04; B28D 1/047
USPC ................ 125/13.01, 35; 83/168, 169
See application file for complete search history.

(56) References Cited

U.S. PATENT DOCUMENTS

| | | | | |
|---|---|---|---|---|
| 1,913,975 | A * | 6/1933 | Coe | ............................... 409/219 |
| 2,201,658 | A * | 5/1940 | Whitney | ........................ 83/169 |
| 2,507,437 | A | 5/1950 | Eserkaln | |
| 2,507,467 | A | 5/1950 | Eserkaln | |

(Continued)

FOREIGN PATENT DOCUMENTS

| | | |
|---|---|---|
| CH | 695933 A5 * | 10/2006 |
| DE | 9211738 U1 * | 9/1992 |

(Continued)

OTHER PUBLICATIONS

XP002557744, Database WPI Week 198020 Thomson Scientific, London, GB; AN 1980-E5049C, English Abstract of SU686885, downloaded Jan. 12, 2009, 1 page.
XP002557745, Database WPI Week 198304 Thomson Scientific, London, GB; AN 1983-B2798K, English Abstract of SU912522, downloaded Jan. 12, 2009, 1 page.
English Abstract for JP 2006312567, published Nov. 16, 2006, 2 pages.

(Continued)

*Primary Examiner* — Orlando E Aviles
*Assistant Examiner* — Joel D Crandall
(74) *Attorney, Agent, or Firm* — Burr & Forman, LLP

(57) ABSTRACT

A cutting machine having a liquid lubrication delivery system. The machine includes a work-piece platform having an upper surface for supporting a work-piece thereupon. The work-piece platform can further include a main channel defining a recess in the upper surface. At least one liquid lubrication inlet for discharging liquid into the main channel can also be present on the work-piece platform. The at least one liquid lubrication inlet can be a plurality of liquid lubrication inlets.

19 Claims, 24 Drawing Sheets

(56) References Cited

U.S. PATENT DOCUMENTS

| | | | |
|---|---|---|---|
| 3,069,950 A | 12/1962 | Hensley | |
| 3,127,886 A * | 4/1964 | Miller | B23D 59/02 |
| | | | 125/13.01 |
| 3,170,352 A * | 2/1965 | Hensley | B23D 59/02 |
| | | | 83/168 |
| 3,479,097 A * | 11/1969 | McLauchlan | B23D 59/04 |
| | | | 384/12 |
| 3,568,377 A * | 3/1971 | Blohm et al. | B24B 55/02 |
| | | | 451/444 |
| 4,484,417 A * | 11/1984 | Klingerman | B23D 59/02 |
| | | | 125/13.01 |
| 5,092,044 A * | 3/1992 | Edgerton et al. | 30/123.4 |
| 5,127,391 A | 7/1992 | O'Keefe | |
| 5,220,857 A * | 6/1993 | Freeburger | 83/468.3 |
| 6,272,961 B1 | 8/2001 | Lee | |
| 2002/0100353 A1 | 8/2002 | Lee | |
| 2002/0162548 A1* | 11/2002 | Lee | B23D 47/025 |
| | | | 125/12 |
| 2004/0031365 A1* | 2/2004 | Lee | 83/437.1 |
| 2004/0035273 A1* | 2/2004 | Lee | 83/435.12 |
| 2007/0295179 A1 | 12/2007 | Sheddy | |
| 2008/0173292 A1 | 7/2008 | Chen | |
| 2009/0277315 A1* | 11/2009 | Ipatenco et al. | 83/171 |
| 2010/0116261 A1* | 5/2010 | Fairweather et al. | 125/13.01 |

FOREIGN PATENT DOCUMENTS

| | | | | |
|---|---|---|---|---|
| DE | 9211738 U1 * | 1/1993 | | B23D 59/02 |
| GB | 662310 A * | 12/1951 | | |
| GB | 1034961 A * | 1/1963 | | |
| JP | 2006312567 A | 11/2006 | | |
| SU | 686885 A | 9/1979 | | |
| SU | 912522 A | 3/1982 | | |
| SU | 912522 A1 * | 3/1982 | | |

OTHER PUBLICATIONS

International Preliminary Report on Patentability with Written Opinion for International Application No. PCT/US2009/037352, dated Sep. 20, 2011, 8 pages.

International Preliminary Report on Patentability with Written Opinion for International Application No. PCT/US2010/027691, dated Sep. 20, 2011, 9 pages.

International Search Report and Written Opinion for International Application No. PCT/US2009/037352 dated Dec. 11, 2009.

International Search Report and Written Opinion for International Application No. PCT/US2010/027691 dated Jun. 17, 2010.

* cited by examiner

CUTTING MACHINE WITH A LIQUID LUBRICATION DELIVERY SYSTEM HAVING A CONTROLLED LIQUID LEVEL

CROSS-REFERENCE TO RELATED APPLICATIONS

The present application is a continuation-in-part application of PCT/US2010/027691 filed Mar. 17, 2010, which claims priority to International Application No. PCT/US2009/037352, filed 17 Mar. 2009, said applications are hereby incorporated by reference in their entirety.

FIELD

The invention relates to the field of cutting machines, and more particularly, to cutting machines including a liquid lubrication delivery system.

BACKGROUND OF THE INVENTION

Typical tile and masonry saws have cooling mechanisms because as the blade rotates and cuts through a piece of tile, the friction between the blade and the tile generates heat. Such heat can be damaging to the blade. Several solutions exist to solve this problem.

For example, there are tile saws that have a sub-surface basin filled with static coolant, such as water. In these saws, the blade extends into the basin and at least a portion of the blade's perimeter is always submerged in the water. When the tile saw is operated, the blade rotates in the water cooling the blade. Although heat damage is reduced by the cooling, part of the blade is always submerged in the water, which can be damaging.

Another type of tile saw with a cooling mechanism employs nozzles directed toward the top and/or sides of the cutting blade. In some saws, the nozzles are integrated with the blade guard housing. In other saws, the nozzles are positioned outside the blade guard but are directed at the blade from above the work-piece to be cut. Although these systems eliminate submersion of the blade in a water basin, a new problem of overspray arises. As the nozzles spray water against the rotating blade, water is splashed off the blade creating a mess in the work area and wetting the operator. Furthermore, this system wastes water because much of the water is splashed off of the blade before it can properly cool the blade.

To address this problem of overspray, splash guards, splash curtains, and guard houses with baffles have been employed to block or re-direct the overspray downwardly towards the work-piece. These solutions, however, still use more water than necessary to cool the blade and leave the top of the work-piece soaked. Additionally, debris and dust from cutting the work-piece can build up on the work table and on the cutting blade.

Therefore, there is a need for a cutting machine including a liquid lubrication delivery system that minimizes and controls liquid overspray and debris accumulation during operation, while also reducing the amount of liquid needed to properly cool and lubricate the cutting blade.

SUMMARY

The present disclosure is directed to a cutting machine having a liquid lubrication delivery system. This cutting machine having a liquid lubrication delivery system contains and controls liquid lubricant to efficiently cool, lubricate, and remove debris from a cutting blade.

One embodiment takes the form of a work-piece platform. The work-piece platform can include an upper surface for supporting a work-piece. The work-piece platform can further include a main channel defining a recess in the upper surface. At least one liquid lubrication inlet for discharging liquid into the main channel can also be present on the work-piece platform. The at least one liquid lubrication inlet can be a plurality of liquid lubrication inlets. The plurality of liquid lubrication inlets can be spaced equidistant along a length of the main channel. The work-piece platform can further include a pressurized channel located substantially adjacent the main channel. The pressurized channel can be located on one of a left side of the main channel, a right side of the main channel, or beneath the main channel. The pressurized channel can span substantially a length of the main channel.

The work-piece platform can further include at least one inlet nozzle configured to supply liquid to the pressurized channel. The work-piece platform can include an inlet sheet formed between the pressurized channel and the main channel, wherein the inlet sheet has a plurality of apertures formed therethrough fluidly coupling the pressurized channel to the main channel. The plurality of apertures can be spaced equidistant along the inlet sheet. In at least one embodiment, only a single aperture is present in a widthwise direction, transverse to the lengthwise direction which is the longest dimension of the inlet sheet, of the inlet sheet. In an embodiment, the plurality of apertures can be spaced to provide a substantially uniform depth of liquid in the main channel. The inlet sheet can be removable.

In another embodiment, the work-piece platform can include at least one nozzle. The at least one inlet nozzle can include two inlets of the inlet nozzle. The two inlets can be located substantially in the midpoint along a length of the pressurized channel and supply fluid in substantially opposite directions into the pressurized channel.

In yet another embodiment, the work-piece platform can include at least one nozzle located below a bottom surface of the work-piece platform. The at least one nozzle can include at least two nozzles located below a bottom surface of the work-piece platform. The at least two nozzles comprises at least one left nozzle and at least one right nozzle, wherein the at least one right nozzle supplies fluid through the plurality of work-piece inlet apertures of the main channel and the at least one left nozzle supplies fluid through the plurality of work-piece inlet apertures of the main channel, such that the fluid supplied by the at least one left nozzle and at least one right nozzle is directed toward a blade positioned in the main channel. The at least one left nozzle can include two left nozzles. The at least one right nozzle comprises two right nozzles. The work-piece platform can include a plurality of work-piece inlet apertures formed in the main channel. The work-piece platform as recited in claim 16, wherein the at least one right nozzle comprises two right nozzles.

In yet another embodiment, a cutting machine can include the work-piece platform as described herein. Additionally, the cutting machine can include a blade and at least one nozzle is in a fixed position relative to the blade. In at least one embodiment, the at least one nozzle can include two nozzles. The at least one nozzle can be mounted on a cross-member portion of the cutting machine.

One embodiment takes the form of a cutting machine having a liquid lubrication delivery system that includes a work-piece platform having a main channel establishing an elongate recessed space in the upper surface of the work-piece platform. The main channel has a bottom opposite, a first side, and a second side. A perimeter of a cutting blade of the cutting machine can be received in the main channel during cutting operations. The liquid lubrication delivery system includes a liquid delivery portion at the upstream end of the main channel and a liquid leveler portion at the downstream end of the main channel. The liquid delivery portion has at least one liquid lubrication inlet having a discharge within the main channel. The liquid lubrication inlet is configured to promote flow of discharged lubricant from a liquid source in the main channel predominantly in one lengthwise direction from a liquid source. In one example, the liquid from the liquid source is transferred to the main channel by a lubricant distribution manifold via the liquid lubrication inlets; each liquid lubrication inlet has an inlet end open to the lubricant distribution manifold and a discharge opening open to the main channel. The configuration of the inlets along the main channel fosters sufficient flow speed of liquid within the main channel to provide an adequate sweeping flow that removes debris from the main channel and cools the cutting blade. In at least exemplary embodiment, the lubrication inlets can be tapered, positioned at an angle to the longitudinal axis of the main channel, and/or serially spaced lengthwise along the main channel. Such configuration pressurizes lubrication liquid as it passes through an inlet and causes it to contact the opposing wall of the main channel upon exit. This disperses the liquid to fill the main channel. Because the liquid is pressurized and constantly flowing through the inlets, liquid flows through the main channel and out an open end at a downstream end. Also, because of this arrangement, the majority of the liquid generally flows in one lengthwise direction down the main channel.

The liquid leveler portion has at least one outlet recessed into the upper surface of the work-piece platform. Each outlet has a mouth within one of the sides of the main channel. The outlet also has an outlet end opposite to the mouth. The outlet is configured to remove excess discharged lubricant from the main channel, whereby the excess discharged lubricant flows from the mouth to the outlet end of the at least one outlet. The configuration of the at least one outlet allows for a controlled liquid level in the main channel. In an exemplary embodiment, the outlet is declined from the mouth to the outlet end, which opens to an orifice that is fluidly connected to the liquid source. The outlet declines such that the mouth is at a higher altitude than the outlet end. The difference between the pressure at the mouth and the pressure at the outlet end promotes liquid flow from the mouth to the orifice. Hence, when the liquid level in the main channel approaches the level of the mouth in the main channel, the liquid exits the main channel through the mouth of the outlet, flows out of the outlet end towards the orifice, and returns to the liquid source. Thus, liquid lubrication delivery system can more readily maintain a predetermined liquid level in the main channel by removing excess liquid and recycling the excess discharged liquid back to the liquid source.

The cutting machine described herein has a liquid lubrication delivery system to maintain a relatively constant level and velocity of flowing liquid lubricant in the main channel to cool a cutting blade or grinding blade. Also, this cutting machine minimizes the overspray typically associated with cutting tools employing lubrication delivery systems. As a result, the cutting machine described herein having a liquid lubrication delivery system provides a more compact cutting machine that effectively and efficiently cools a cutting blade and controls liquid lubricant delivery to the cutting blade.

BRIEF DESCRIPTION OF THE DRAWINGS

The foregoing features of the invention will be more readily understood by reference to the following detailed description, taken with reference to the accompanying drawings, in which.

DETAILED DESCRIPTION OF THE PREFERRED EMBODIMENTS

A cutting machine having a liquid lubrication delivery system configured according to the present teachings will hereinafter be described more fully with reference to the accompanying drawings in which preferred embodiments of the system are illustrated. Additionally, as described herein, the present disclosure presents a work-piece platform. The work-piece platform can include an upper surface for supporting a work-piece. The work-piece platform can further include a main channel defining a recess in the upper surface. At least one liquid lubrication inlet for discharging liquid into the main channel can also be present on the work-piece platform. Additional features of the work-piece platform and cutting machine are This system can, however, be embodied in many different forms and should not be construed as limited to the embodiments set forth herein. Rather, these embodiments are provided so that this disclosure will be thorough and complete, and will fully convey the scope of the invention to those persons skilled in the art. In the figures and description, like reference numbers refer to like elements throughout.

Several definitions that apply throughout this document will now be presented. The word "brim" is defined as the upper edge of anything that is hollow. For example, the brim of a main channel is the upper edge of the main channel, specifically this can be the upper edge of one of the side walls of the main channel. Additionally, the brim of other portions of the liquid lubrication system can have brim. The term "mouth" is defined as any opening, inlet, cleft, groove, recess, or any other opening that provides an entrance or an exit to a main channel. The exit can be configured in the form of a trough, passageway, tube, channel or other similar feature. Further definitions will be presented below.

Figure 1:
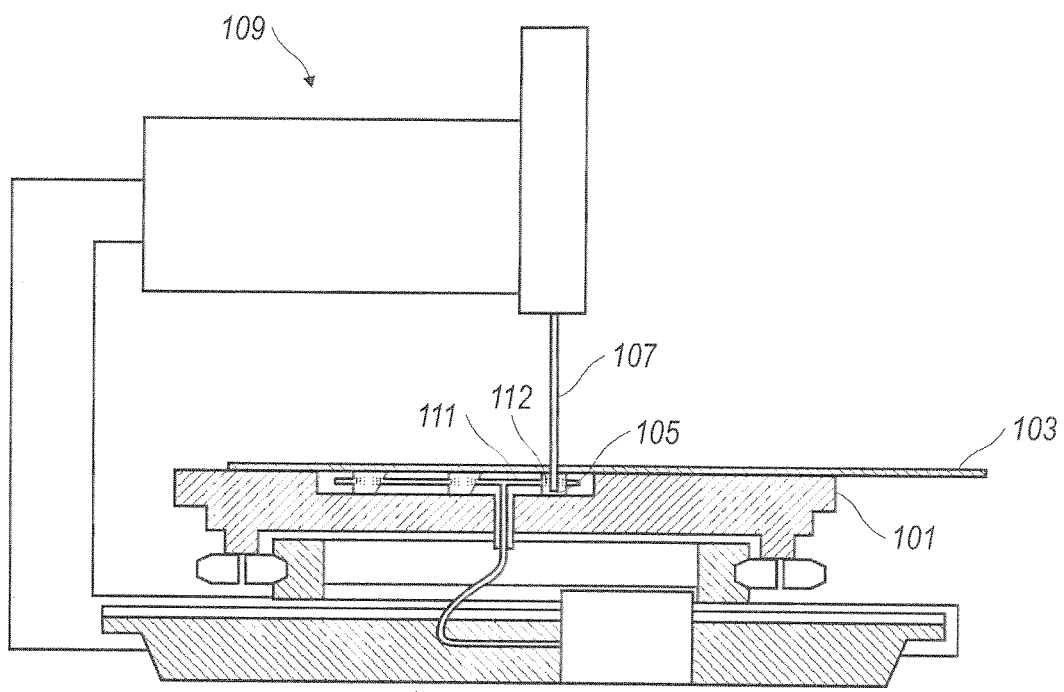
FIG. 1 is a front view of one embodiment of a cutting machine including a liquid lubrication delivery system configured according to the teachings of this disclosure.

Referring to FIG. 1, a cutting machine 109 is shown having a liquid lubrication delivery system including a work-piece platform 101, a main channel 105 recessed in an upper surface of the work-piece platform 101 and which receives a perimeter of a cutting blade 107 of the cutting machine 109. The liquid lubrication delivery system includes a liquid delivery portion and a liquid leveler portion. The liquid delivery portion (not labeled) has liquid lubrication inlets 111 having discharge openings 112 into the main channel 105 are also depicted. The platform 101 is shown having an upper surface for supporting a work-piece 103 thereupon. Such a work-piece 103 can be of a sheet-type such as the case with ceramic tile, clay tile, stone, marble, or other similar sheet-type material. The work-piece 103 can also be of non-sheet-type material such as bricks, pavers, or the like.

Figure 2:
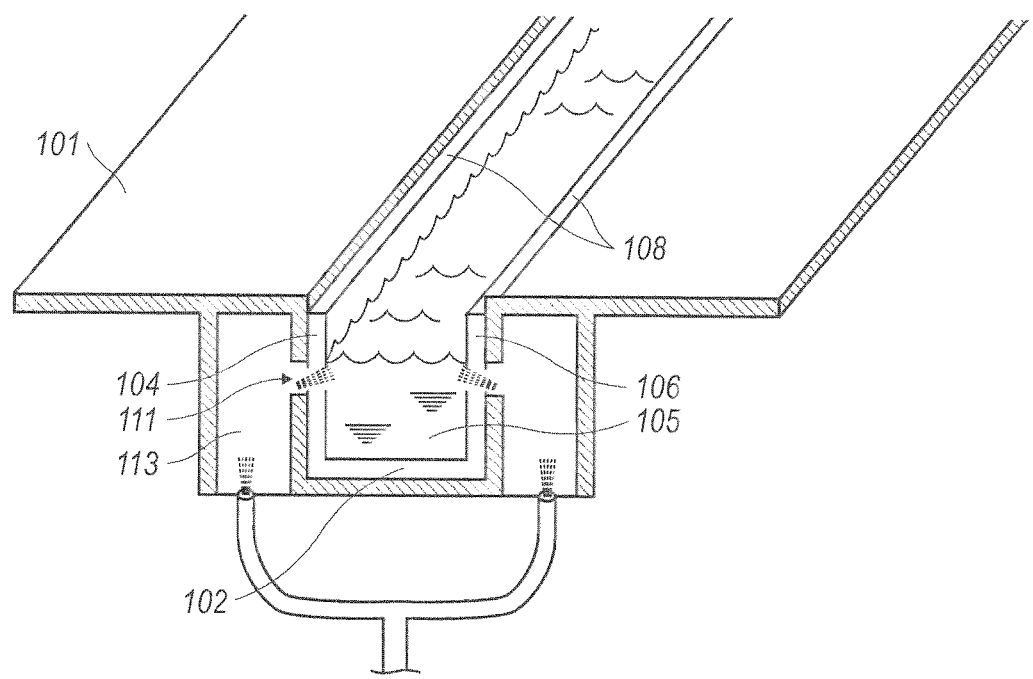
FIG. 2 is a cross-sectional perspective view of the work-piece platform of one embodiment of a cutting machine including a liquid lubrication delivery system.
Figure 3:
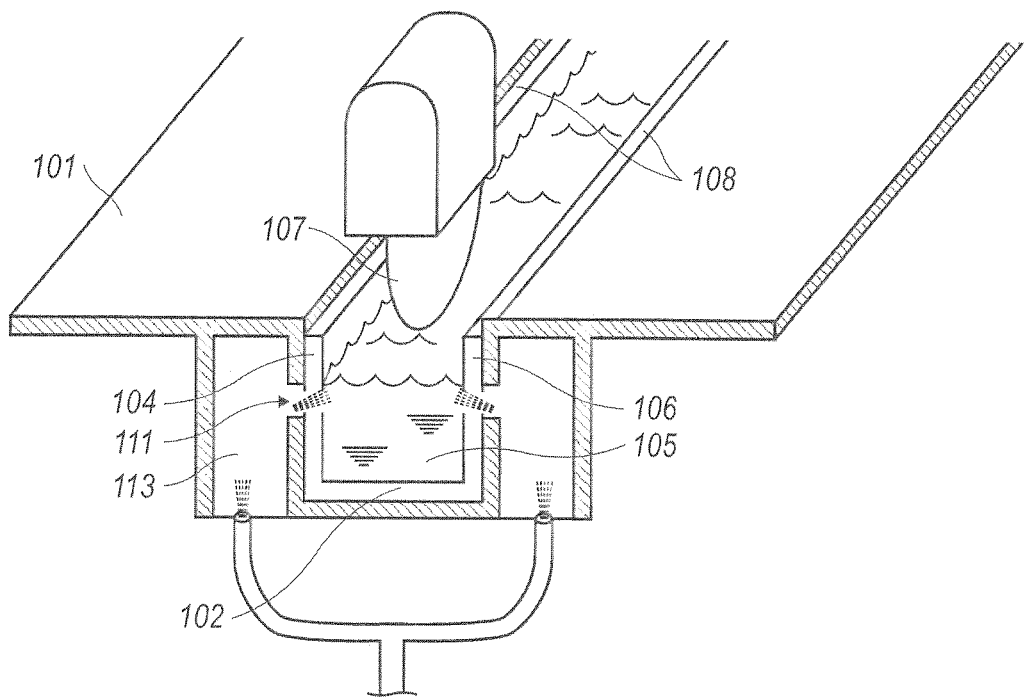
FIG. 3 is another cross-sectional perspective view of the work-piece platform of FIG. 2 but further including a liquid lubrication delivery system having a perimeter of a cutting blade having a perimeter thereof received in the main channel.
Figure 4:
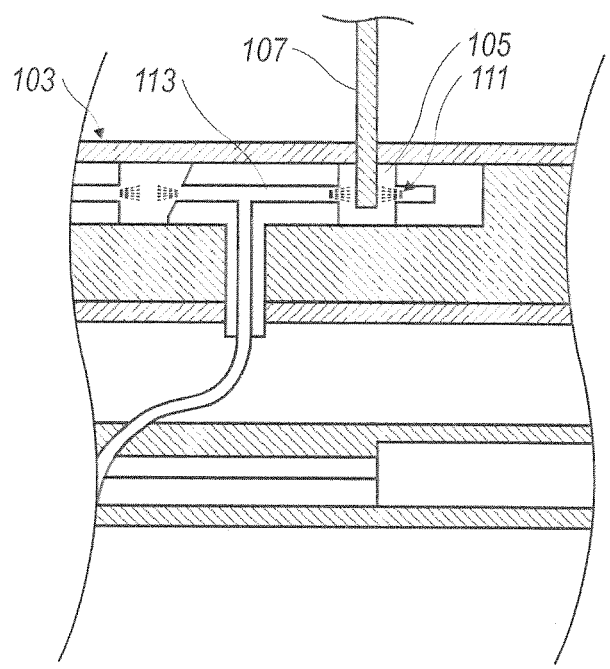
FIG. 4 is a cross-sectional front view of one embodiment of the work-piece platform and lubricant distribution manifold of a cutting machine including a liquid lubrication delivery system showing a perimeter of the cutting blade of the cutting machine received in the main channel.
Figure 5:
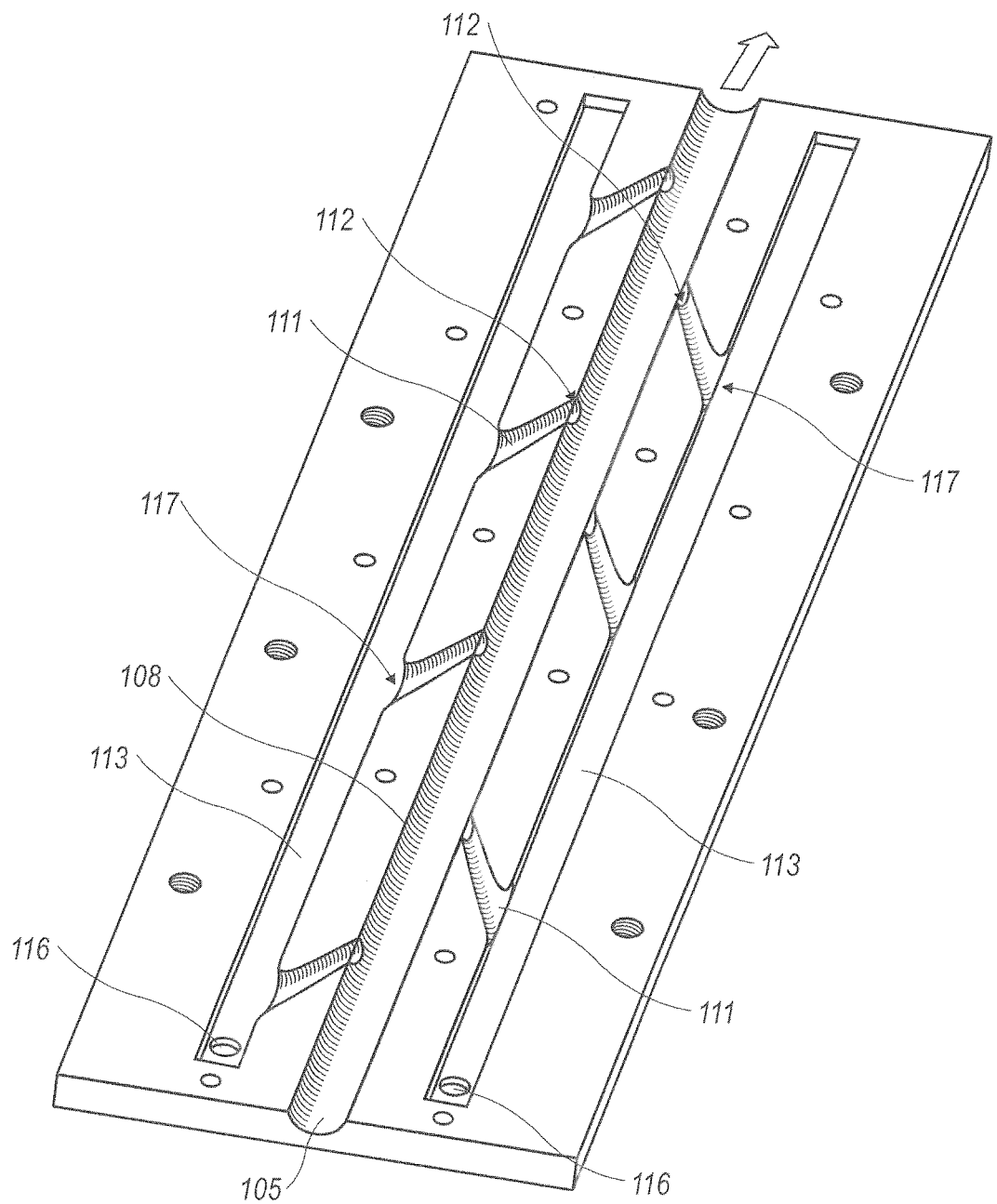
FIG. 5 is a perspective view of a portion of the work-piece platform of FIG. 6 showing a main channel connected to two lubricant distribution manifolds.

The main channel 105 establishes an elongate recessed space into the upper surface of the platform 101. As shown in FIGS. 2 and 3, the main channel 105 is defined by a bottom 102 opposite to the upper surface of the platform 101, a first side 104, and a second side 106. The first and second sides, 104, 106 are perpendicular to the bottom 102 and upper surface of the platform 101. The main channel 105 is open and forms an open slot that is deep enough to receive a perimeter of the cutting blade 107 of the cutting machine 109 during cutting operations. Also illustrated in FIGS. 2 and 3, the main channel 105 includes a brim 108. The brim 108 can be level with the upper surface of the platform, recessed slightly from the upper surface of the platform, slightly raised in relation to the platform, or some combination thereof. These configurations will be herein referred to as being proximate to the upper surface of the platform 101. Returning to FIG. 1, at least one liquid lubrication inlet 111 has a discharge opening 112 that opens into the main channel 105. The liquid lubrication inlet 111 is configured to promote flow of discharged lubricant in the main channel 105 predominantly in one lengthwise direction of the main channel 105. For example, the liquid lubrication inlet 111 and the discharge opening 112 are configured to generally discharge lubricant in a direction away from the first end or upstream end of the channel 105. Those skilled in the art will note that more than one liquid lubrication inlet 111 can be used as seen in FIGS. 4 and 5. Also, the main channel 105 must be sufficiently wide and deep to accommodate the prescribed volume of liquid being delivered from the liquid lubrication inlet 111 but narrow and shallow enough to maintain a steady flow and velocity of delivered liquid within the main channel 105.

As shown in FIGS. 2, 3, and 5, the liquid lubrication inlets 111 are fluidly connected to at least one lubricant distribution manifold 113. The lubricant distribution manifold 113 fluidly connects the main channel 105 with a liquid source. Liquid from the liquid source, such as a basin, faucet, reservoir, or the like is transferred to the main channel 105 by the lubricant distribution manifold 113 via the liquid lubrication inlets 111. Each liquid lubrication inlet 111 has an inlet end 117 open to the lubricant distribution manifold 113 and a discharge opening 112 open to the main channel 105. It will be appreciated that more than one lubricant distribution manifold 113 can be used to deliver liquid from the liquid source to the main channel 105. For instance, in FIGS. 2 and 3, two lubricant distribution manifolds 113 are shown fluidly connected to the main channel 105, one on each side of the main channel 105, by liquid lubrication inlets 111.

Figure 9:
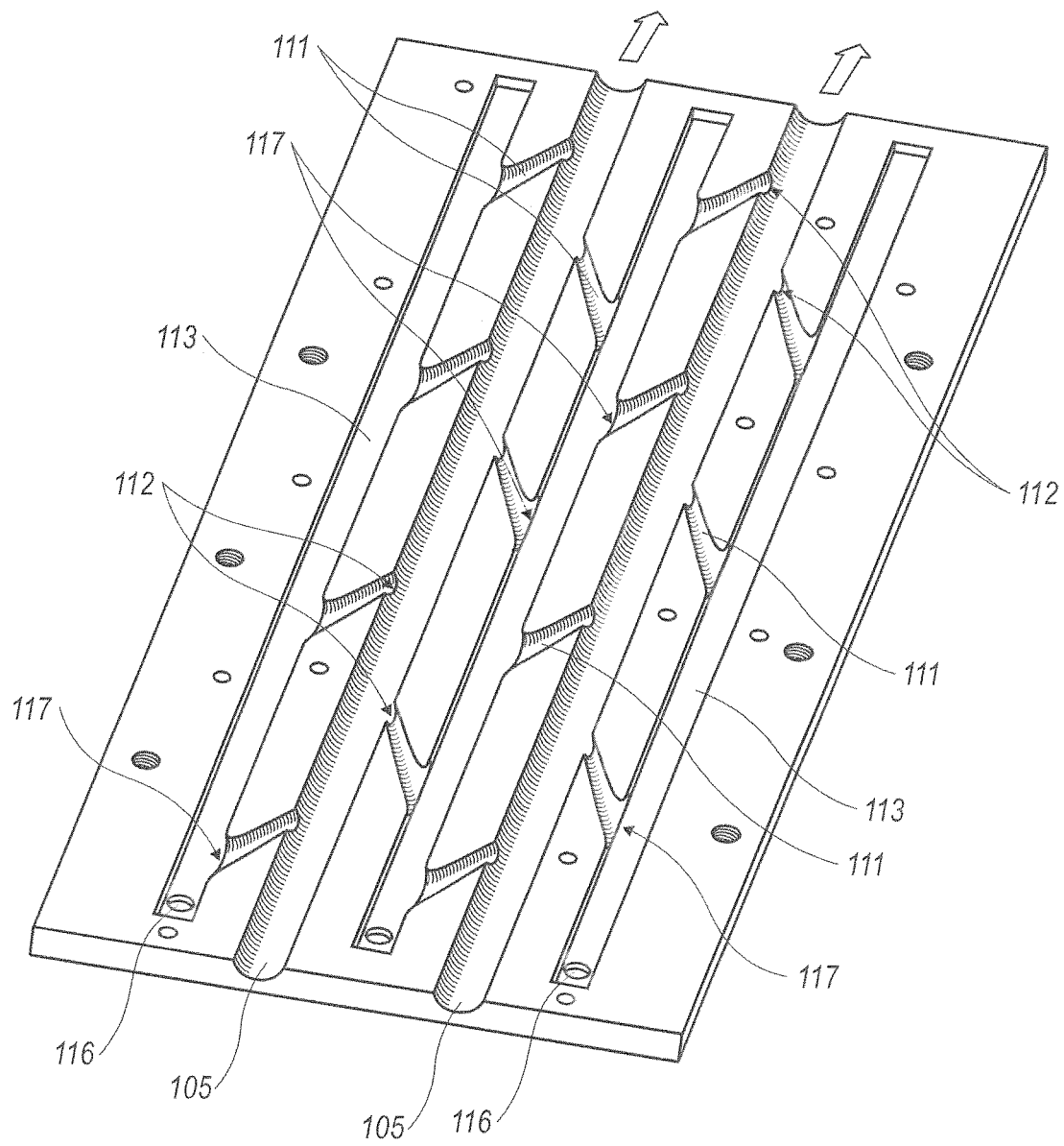
FIG. 9 is a perspective view of another embodiment of the work-piece platform of a cutting machine including a liquid lubrication delivery system in which a lubricant distribution manifold is connected to two main channels.

FIGS. 5 and 9 provide more detailed views of exemplary lubricant distribution manifolds 113. In the depicted embodiments, a manifold 113 is positioned on each side of and parallel to the main channels 105. At one end of the manifold 113 is an entry point 116 through which liquid from a liquid source enters. Multiple liquid lubrication inlets 111 fluidly connect each manifold 113 to a main channel 105. The inlets 111 can be of uniform longitudinal shapes but can also be tapered as shown in FIG. 5. For example, the inlet can be tapered from the inlet end 117 to the discharge opening 112. The inlets 111 can also be oriented such that the longitudinal axis of each inlet 111 is oriented at an angle to the longitudinal axis of the main channel 105. As liquid continuously enters the manifold 113, the liquid is forced through the inlets 111 into the main channel 105. The velocity and direction of flow in the main channel 105 is determined at least in part by the shape, size, width, and orientation of the inlets 111.

If more than one manifold 113 with multiple lubrication inlets 111 are used, it is not necessary that the same number of inlets 111 connect each manifold 113 to the main channel 105. For example, one manifold 113 can be connected to the main channel 105 by four inlets 111, while the second manifold can be connected to the main channel 105 by three inlets 111. Similarly, the inlets 111 on one side of the main channel 105 need not be directly opposite the inlets 111 on the opposite side of the main channel 105. As depicted in FIG. 5, the inlets 111 are serially spaced apart lengthwise along the main channel 105. Referring to FIG. 5, the direction of liquid flow is shown by the arrow at the top of the figure. Liquid travels through the main channel 105 from the upstream end (closest to the bottom of the figure) to the downstream end (at the top of the figure). Threaded apertures and capped apertures are also shown to demonstrate how the liquid lubrication delivery system can be configured and attached to a cutting machine 109.

In an exemplary embodiment, a lubrication inlet 111 is positioned close to a first end of the respective main channel 105, such as the upstream end. Such positioning aids in thoroughly removing and flushing out any debris and dust that can build up in the main channel 105 during cutting operations.

The manifold 113 can be attached to the work-piece platform 101 in different ways. For example, the manifold 113 can be machined as a separate piece and bolted onto the work-piece platform 101. In this way, the work-piece platform 101 can be interchanged with a platform that does not include the above described liquid lubrication delivery system. Alternatively, the manifold 113 can be cast into the work-piece platform 101.

Figure 6:
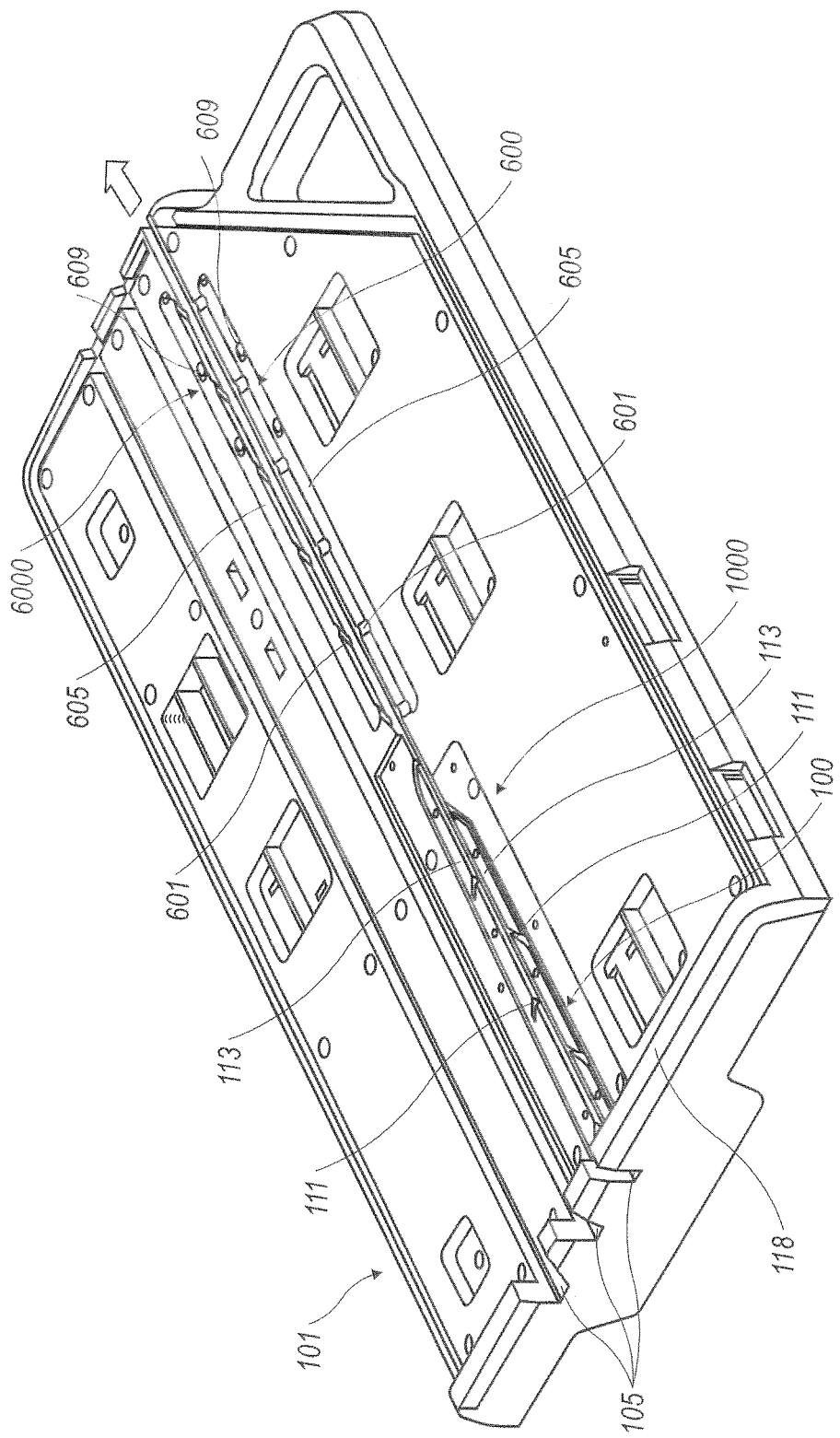
FIG. 6 is a perspective view of the work-piece platform of an embodiment of the cutting machine including a liquid lubrication delivery system having three main channels, one of which is connected to two lubricant distribution manifolds.
Figure 10:
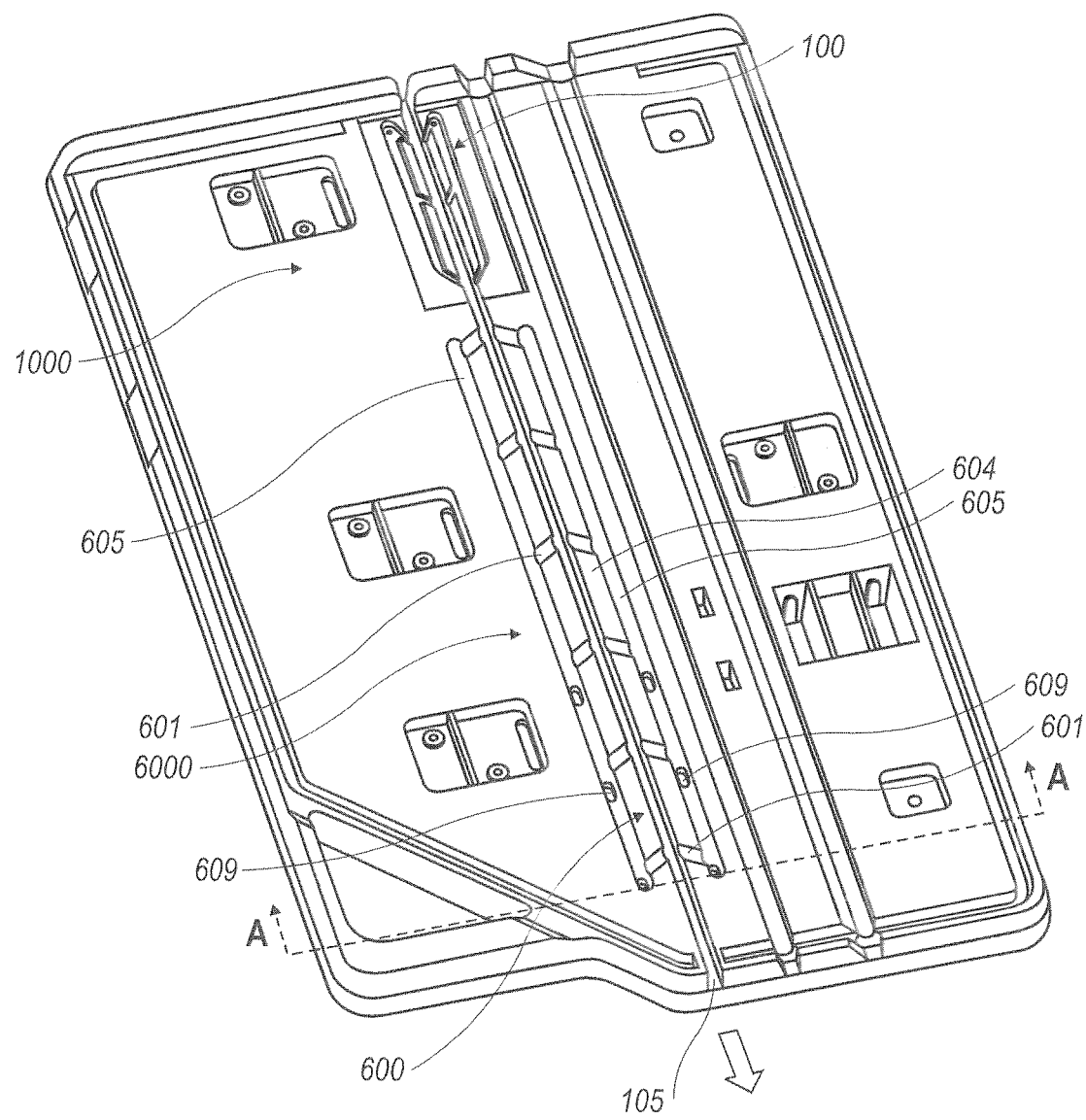
FIG. 10 is a top perspective view of the work-piece platform of an embodiment of the cutting machine including a liquid lubrication delivery system having a liquid delivery portion and a liquid leveler portion.

FIGS. 4, 6, and 10 show a liquid lubrication delivery system having more than one main channel 105 recessed at the upper surface of the work-piece platform 101. The additional main channels 105 can be used for different types of cuts, such as miter cuts, bevel cuts, plunge cuts, or others. Each of these main channels 105 include lubrication inlets 111 connected to manifolds 113. In FIGS. 6, 7, and 10, the liquid delivery portion 100 and the liquid leveler portion 600 are illustrated. As shown in FIGS. 6, 7, and 10, the main channel 105 includes first end 1000 and a second end 6000. In the exemplary embodiment illustrated in FIGS. 6 and 10, the first end is an upstream end 1000, and the second end is a downstream end 6000. The upstream end 1000 is where the liquid lubrication is delivered to the main channel. The downstream end 6000 is where the blade of a cutting machine will enter the main channel 105. The arrow at the upper right side of the FIG. 6 illustrates the direction of liquid flow within the main channel 105. As illustrated, the movement of the blade of the cutting machine will travel through the main channel 105 in a direction opposite to the direction of liquid flow within the main channel 105. In FIG. 10, the arrow at the bottom of FIG. 10 illustrates the direction of liquid flow within the main channel 105 travels from the top of FIG. 10 towards the bottom of FIG. 10. Thus, in FIG. 10, the upstream end 1000 of the main channel 105, where the liquid delivery portion 100 is located, is towards the top of FIG. 10, and the downstream end 6000 of the main channel 105, where the liquid leveler portion 600 is located, is towards the bottom of FIG. 10. However, in other embodiments, the flow of the liquid lubrication can be in the opposite direction in relation to the path of blade travel.

The liquid leveler portion 600 of the liquid lubrication delivery system includes at least one outlet 601 formed in one of the sides of the channel 105. In the illustrated embodiment in FIGS. 6 and 10, the at least one outlet 601 is recessed into the upper surface of the platform 101. Details of the liquid leveler portion 600 will be described with respect to FIGS. 11 and 12, however a brief description of the liquid leveler portion 600 will be provided. The liquid leveler as described herein has at least one outlet. In the particular embodiment, illustrated in FIGS. 6, 7, and 10, the liquid leveler portion 600 comprises a plurality of outlets 601. Specifically, there are twelve outlets 601 fluidly connected to the main channel 105. Additionally, the particular embodiment illustrated in FIGS. 6 and 10 includes an outlet 601 on each side of the main channel 105. Each outlet 601 has two sides, a bottom, and an open top side. Additionally, each outlet 601 has a mouth formed within one side of the main channel 105 and open to the main channel 105. Each outlet 601 also has an outlet end open to an outlet channel 605.

In FIGS. 6 and 10, there are two outlet channels 605. In the particular embodiment illustrated, the two outlet channels 605 are located on each side of the main channel 105 and parallel to the main channel 105. While the illustrated embodiment shows each outlet channel 605 oriented parallel to the main channel 105, one of ordinary skill in the art will appreciate that the outlet channel 605 can be oriented perpendicular to the main channel 105. Each outlet channel 605 can include at least one orifice 609 within the bottom surface of the outlet channel and proximate to the downstream end of the main channel 105 and to the downstream end of the outlet channel 605. In the particular embodiment illustrated, each outlet channel 605 has three orifices 609 within the bottom surface of the outlet channel 605. Additionally, the orifice 609 is located proximate to the downstream 6000 end of the main channel 105 closest to the exit of liquid flow out of the main channel 105 and the entry point of the blade of a cutting machine. The orifice 609 provides an exit aperture for the excess discharged liquid that is moved from the main channel 105 into the outlet channel 605. Alternatively, the at least one outlet 601 can terminate at a drain that is located adjacent to one of the first side or the second side of the channel 105 and at a predetermined distance from the first side or the second side. One of ordinary skill in the art will, however, appreciate that there can be fewer than or more than the twelve outlets 601 depicted in FIGS. 6, 7, and 10. One of ordinary skill in the art will also appreciate that liquid leveler portion 600 of the liquid lubrication delivery system can have fewer or more than two outlet channels 605, each having fewer or more than the three orifices 609 illustrated in FIGS. 6, 7, and 10.

As shown in FIGS. 6 and 10, the plurality of outlets 601 are serially spaced apart lengthwise along the main channel 105. The each of the plurality of outlets 601 is also oriented at an angle to the longitudinal or lengthwise axis of the main channel 105. For example, as illustrated in FIGS. 6, 7, and 10, the outlets 601 are angled towards the lengthwise direction of flow of discharged lubricant in the main channel 105. For example, in FIG. 10, the outlets 601 to the left of the main channel 105 are oriented at an acute angle that is clockwise from the longitudinal axis of the main channel 105. In other words, the outlets 601 to the left of the main channel 105 are oriented at an angle beginning from the longitudinal axis of the main channel 105 and moving away from the main channel 105 in a clockwise direction. The outlets 601 to the right of the main channel 105 are oriented at an acute angle that is counter-clockwise from the longitudinal axis of the main channel 105. For example, the outlets 601 to the right of the main channel 105 are oriented at an angle beginning from the longitudinal axis of the main channel 105 and moving away from the main channel 105 in a counter-clockwise direction. Thus, in FIGS. 6 and 10, the outlets 601 are oriented at an angle that promotes flow of the excess discharged lubricant in the same lengthwise direction as the flow of lubricant within the main channel 105. However, one of ordinary skill in the art will appreciate that the outlets 605 need not be oriented at an acute angle to the longitudinal axis of the main channel 105. In one embodiment, the outlets 605 can be oriented at ninety degrees to the longitudinal axis of the main channel 105 or the outlets 605. In another embodiment, the outlets 605 can be oriented at an angle that promotes flow of excess discharged lubricant in a direction opposite to the direction of flow within the main channel 105.

Figure 7A:
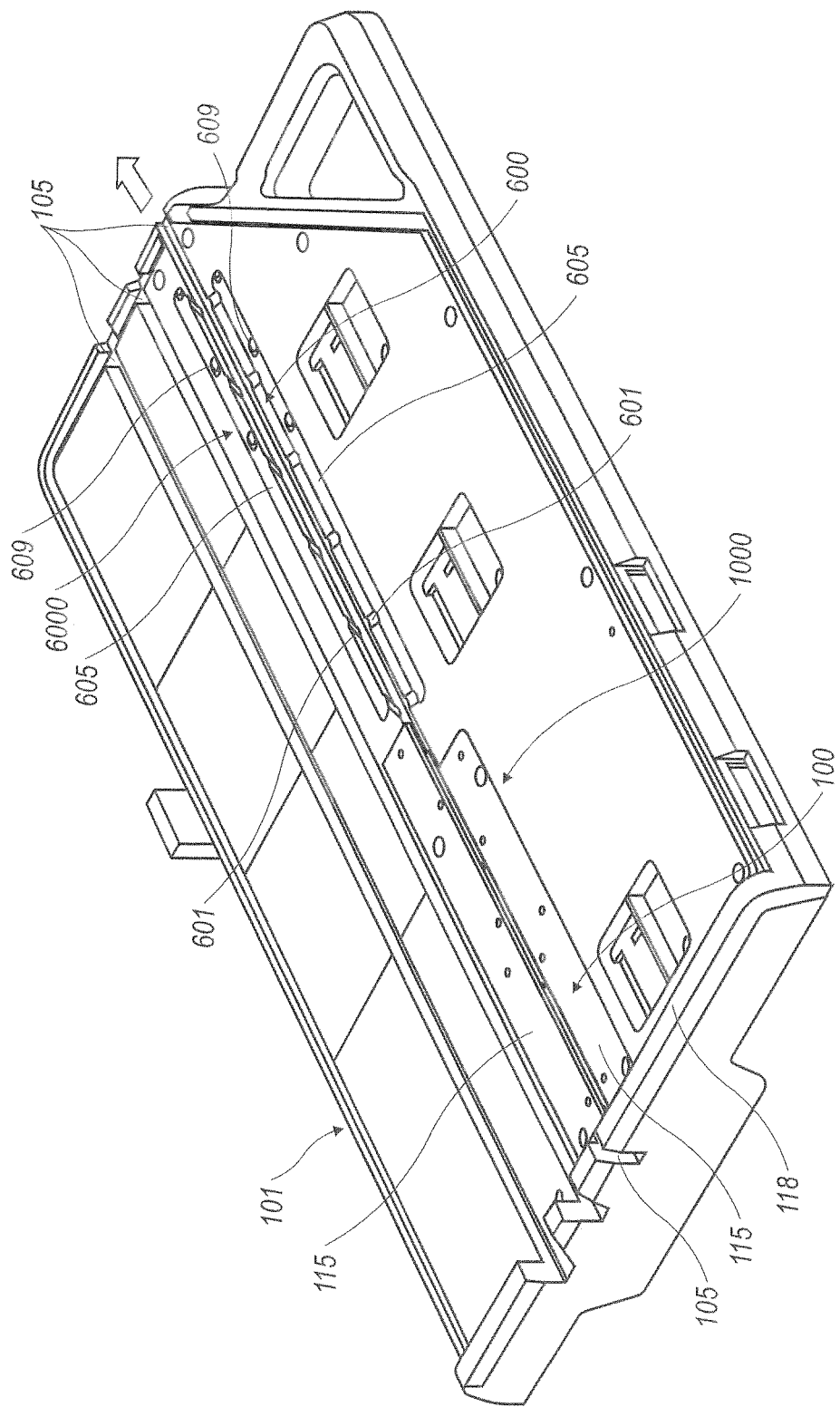
FIG. 7A is a perspective view of the work-piece platform of FIG. 6 showing the lubricant distribution manifold covered by a manifold cover.
Figure 7B:
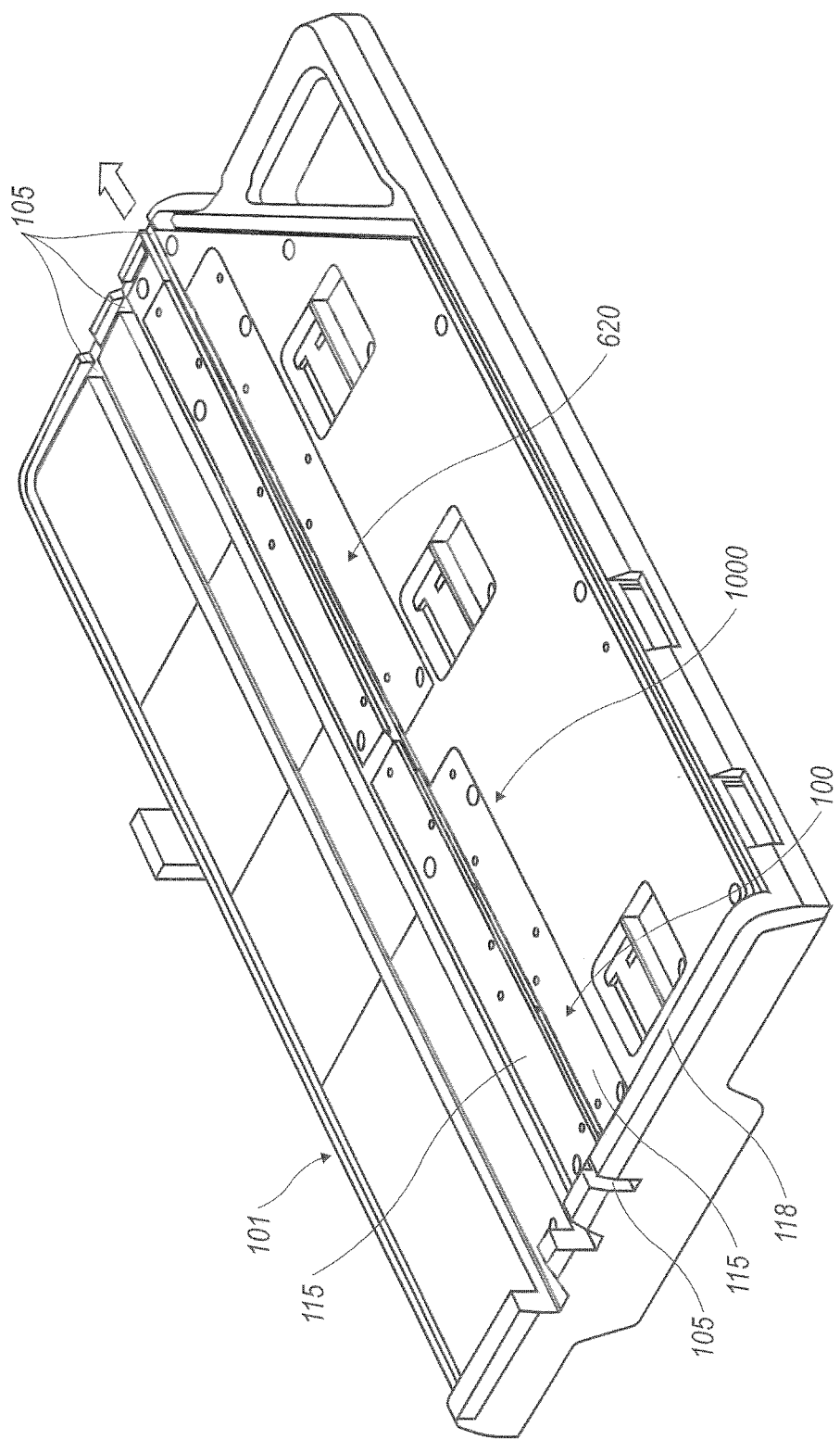
FIG. 7B further includes a liquid leveler cover.

In FIGS. 6, 7A, and 7B, the work-piece platform 101 includes a backstop 118 (on which an edge of a work-piece 103 rests. This provides guidance and resistance to the operator as he moves the work-piece 103 against the cutting blade 107 to cut the work-piece 103. While the illustrated embodiment shows a backstop 118, one of ordinary skill in the art will appreciate that the work-piece platform 101 does not necessarily include a backstop 118.

In the particular embodiment depicted in FIG. 7A, the manifold can be covered by a manifold cover 115 to further prevent overspray and promote uniform and steady flow of liquid to and through the main channel 105 of the liquid lubrication delivery system. While the illustrated embodiment includes a manifold cover 115, one of ordinary skill in the art will appreciate that the liquid lubrication delivery system does not necessarily include a manifold cover 115. In another embodiment shown in FIG. 7B, the liquid leveler portion 600 can be covered by a liquid leveler cover 620. While the illustrated example in FIG. 7B shows a single piece liquid leveler cover 620, one of ordinary skill in the art will appreciate that the liquid leveler cover 620 can include a plurality of pieces. For example, the liquid leveler 620 can include a plurality of cover pieces that fit over each outlet 601. Additionally, the liquid leveler cover 620 can include a cover piece that fits over the outlet channel 605. In either embodiment illustrated in FIG. 7A or 7B, the manifold cover 115 or the liquid leveler cover 620 can be made of polyurethane, plastic, a sheet of metal, or any other material that can be coupled to the work-piece platform 101. Also, the manifold cover 115 and the liquid leveler cover 620 can be coupled to the work-piece platform 101 by any means that secures the manifold cover 115 and the liquid leveler cover 620 to the platform 101. For example, the manifold cover 115 or liquid leveler cover 620 can be glued to the upper surface of the platform 101. In other examples, the manifold cover 115 or liquid leveler cover 620 can be coupled to the platform 101 by fasteners, nuts and bolts, or screws. In yet another example, the manifold cover 115 or the liquid leveler cover 620 can be shaped to fit, snap, or slip into a corresponding shape or opening in the upper surface of the work-piece platform 101.

Figure 8:
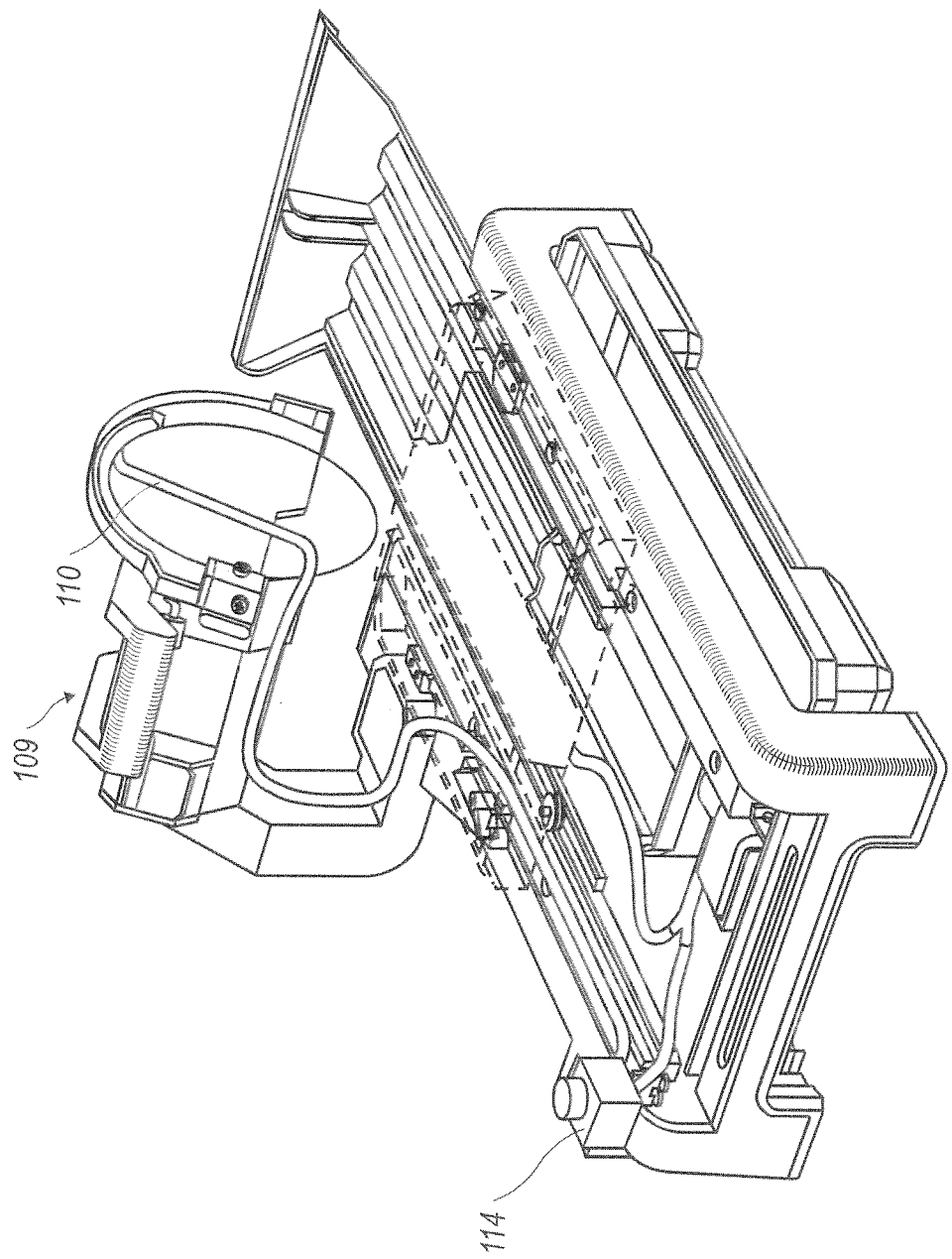
FIG. 8 is perspective view of another embodiment of the cutting machine including a liquid lubrication delivery system that additionally includes an upper liquid lubrication distribution system that discharges lubricant onto the cutting blade at a location above the work-piece platform.

FIG. 8 depicts another embodiment of a cutting machine 109 having a liquid lubrication delivery system. In this embodiment, the system additionally includes an upper liquid lubrication distribution system 110 positioned above the work-piece platform 101 such that it discharges lubricating liquid directly onto the cutting blade 107 at a location above the work-piece platform 101. This embodiment can also include a valve 114 fluidly connected between the liquid lubrication inlet 111 and the upper liquid lubrication distribution system 110. Such valve 114 can be used to allow the operator to dispense liquid lubrication to the main channel 105 or the upper liquid lubrication distribution system 110 or to both the upper liquid distribution system 110 and the main channel 105.

FIG. 9 is an illustration of an alternative embodiment of the liquid delivery portion 100 of a liquid lubrication delivery system having more than one main channel 105. As illustrated in FIG. 9, the liquid delivery portion includes a plurality of manifolds 113 that are each attached to at least one of the main channels 105. FIG. 9 depicts how the previously described manifolds 113 can be configured and attached to a liquid lubrication delivery system having multiple main channels 105. In FIG. 9, two main channels 105 are each connected to two lubricant distribution manifolds 113, but the main channels 105 share a distribution manifold 113.

Figure 11:
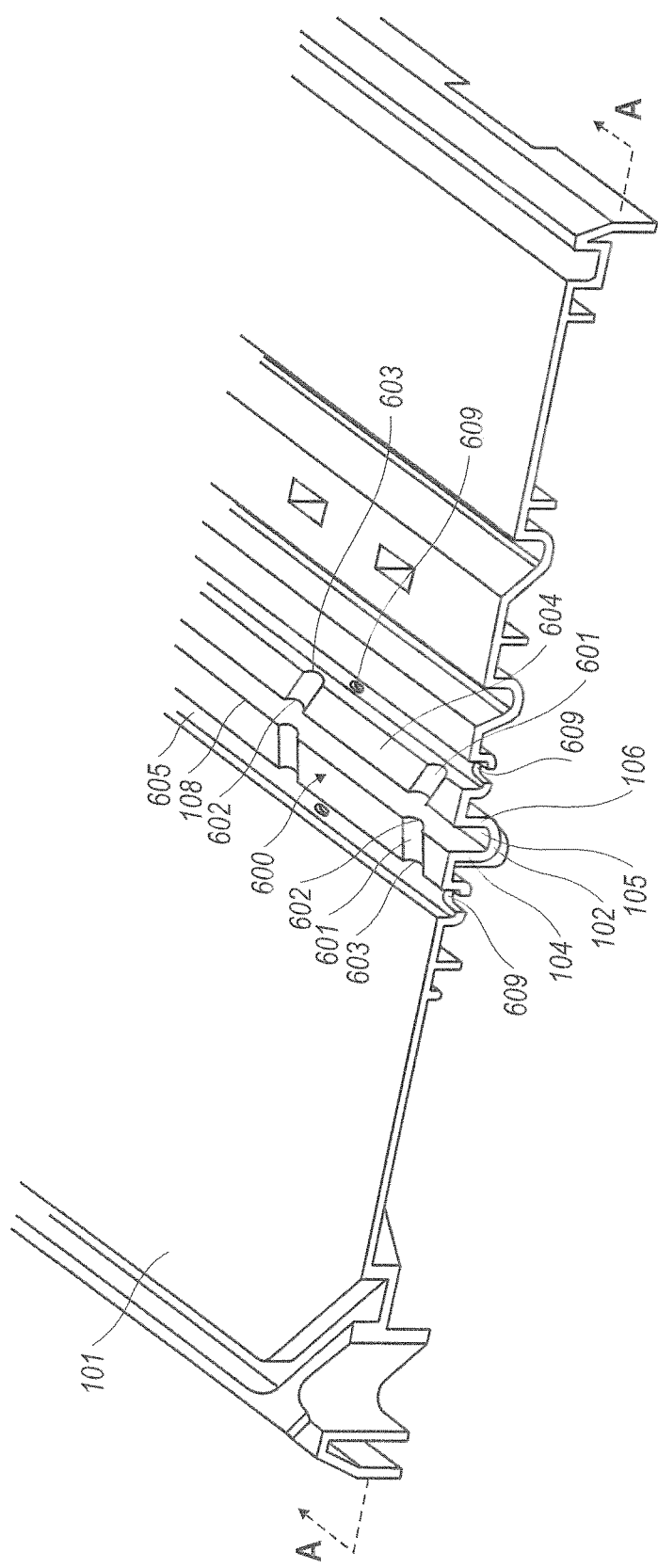
FIG. 11 is a cross-section view of the work piece platform illustrated in FIG. 10 taken along the line A-A.
Figure 12:
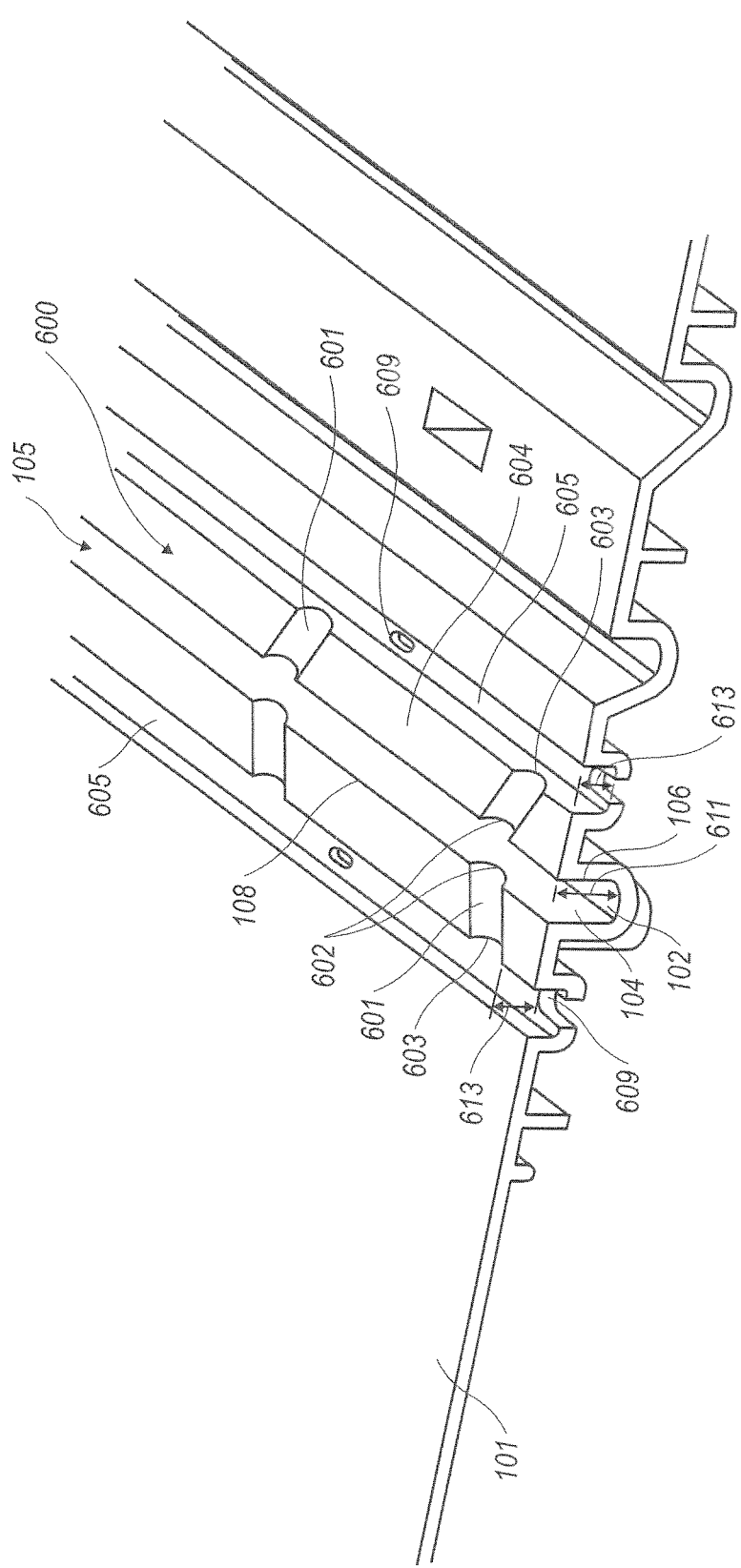
FIG. 12 is a close-up view of the cross-section illustrated in FIG. 11 showing the cross-section of the liquid leveler portion of the liquid lubrication delivery system.

Details of the outlets 601 of the liquid leveler portion 600 of the liquid lubrication delivery system will now be described with respect to FIGS. 11 and 12. FIG. 11 illustrates a partial view of the work-piece platform 101 illustrated in FIG. 10 showing a cross-section taken at line A-A of the downstream end 6000 of the platform 101. FIG. 12 is a close-up view of FIG. 11. As shown in FIGS. 11 and 12, the at least one outlet 601 is recessed into the upper surface of the platform 101. The outlet 601 has two sides, a bottom, an open top side, and a mouth 602 formed within one of the first side 104 and second side 104 of the main channel 105 at the brim 108. The outlet is configured to remove excess discharged lubricant from the main channel 105. In the particular embodiment illustrated in FIGS. 11 and 12, the mouth 602 is open to the main channel 105 such that any lubricant discharged into the main channel 105 that that exceeds a predetermined level enters the mouth 602 and flows through the outlet 601 and out of the main channel 105, thereby maintaining a suitable level of liquid lubricant.

The outlet 601 can also include an outlet end 603 opposite to the mouth 602 and spaced a predetermined distance away from the brim 608 of the main channel 105, whereby the outlet 601 promotes the flow of excess liquid lubrication from the mouth 602 to the outlet end 603. In the illustrated embodiment of FIGS. 11 and 12, the outlet 601 is downwardly inclined from the brim 108 of the main channel 105 to the outlet end 603. As a result, the bottom surface of the outlet 601 has a negative slope thereby promoting flow of excess discharged lubricant from the main channel 105 downward and away from the main channel 105. In the particular embodiment illustrated in FIGS. 11 and 12, the outlet 601 is downwardly inclined and has the outlet end 603 open to an outlet channel 605 that is oriented parallel to the main channel 105. As seen in FIGS. 11 and 12, the portion 604 of the upper surface where the outlets 601 are recessed is also downwardly inclined to correspond with the downward incline of the outlet 601. When excess lubricant from the main channel 105 flows from the mouth 602 down to the outlet end 605, the excess lubricant empties into the outlet channel 605. In FIGS. 11 and 12, the outlet channel includes an orifice 609 through the bottom surface. In one embodiment, the orifice 609 can be fluidly connected to the liquid lubrication source, thereby allowing the excess discharged lubricant that flows from the main channel 105 into the outlet channel 605 to flow back into the liquid lubrication source and be recycled in the liquid lubrication delivery system. In another embodiment, the orifice 609 can be open to the ground or to the surrounding environment and the excess discharged lubricant that flows from the main channel into the outlet channel 605 will fall to the ground or be expelled into the surrounding environment. In yet another embodiment, the orifice 609 can be open to and in fluid communication with a drain pan (not shown) located beneath the work-piece platform 101.

FIG. 12 illustrates the relationship of the depth of the main channel 105 and the liquid leveler portion 600 of the liquid lubrication delivery system. The main channel 105 has a first depth 611 measured from the bottom 102 to the brim 108 of the main channel 105. Recessed within the sides 104, 106 of the main channel 105 proximate to the brim 108 is the mouth 602 of the outlet 601. The mouth 602 of each of the outlets 601 has a relatively shallow depth which allows a predetermined level of liquid lubricant to remain in the main channel 105. The outlet channel 605 located on each side of and parallel to the main channel 105, each has a second depth 613. As illustrated in FIG. 12, the second depth 613 is less than the first depth 611. However, one of ordinary skill in the art will appreciate that in another embodiment, the second depth 613 can be equal to the first depth 611.

Figure 13:
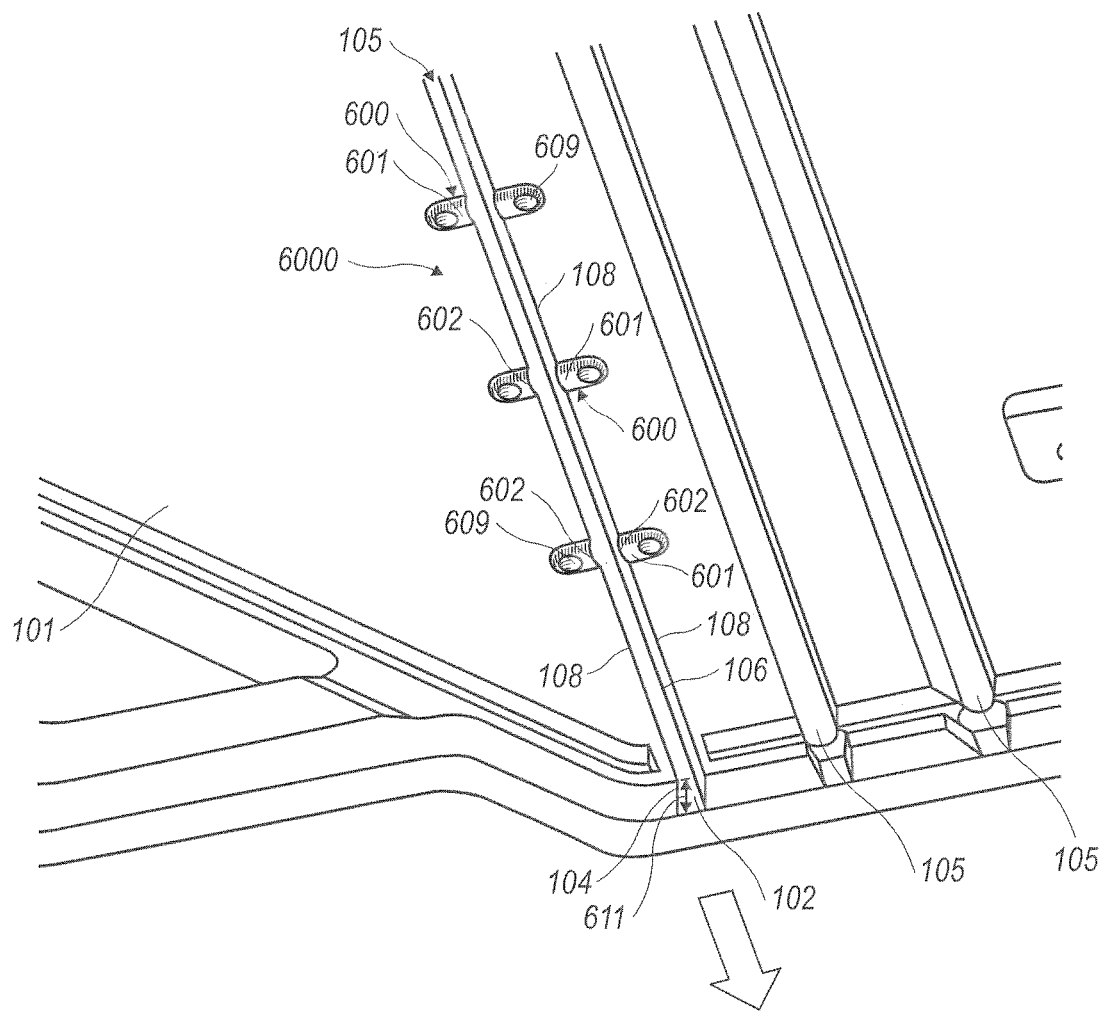
FIG. 13 is a partial perspective view of another embodiment of the cutting machine including a liquid lubrication delivery system that includes an alternative liquid leveler portion.

FIG. 13 illustrates an alternative embodiment of the liquid leveler portion 600 of the liquid lubrication delivery system that does not include an outlet channel. In FIG. 13, the liquid leveler portion 600 is located at a downstream end 6000 of the main channel 105 of the work-piece platform 601. As shown in FIG. 13, the direction of liquid flow in the main channel 105 is represented by the arrow at the bottom of FIG. 13 and indicates liquid flows in the main channel 105 from the top to the bottom of FIG. 13. The liquid leveler portion 600 illustrated includes an outlet 601 and an orifice 609. The outlet 601 is recessed within the upper surface of the work-piece platform 101 at a downstream end of the main channel 105. The outlet 601 has a mouth 602 within the one of the sides 104, 106 of the main channel 105 proximate to the brim 108 of the main channel 105. An orifice 609 is located within the outlet 601 opposite to the mouth 602. In the embodiment illustrated in FIG. 13, the outlet 601 is configured to promote flow of excess discharged lubricant from the main channel 105 away from the main channel 105 in a direction perpendicular to the main channel 105. Thus, when liquid lubricant fills the main channel 105 and the liquid lubricant approaches the mouth 602 of the outlet 601, the excess discharged lubricant in the main channel that exceeds the mouth 602 of the outlet will enter the outlet 601 via the mouth 602. The excess discharged lubricant will flow into the outlet 601 and down through the orifice 609 within the outlet 601. Thus, the discharged lubricant within the main channel 105 will flow out of the main channel 105 into the outlet 601, thereby reducing the possibility that the level of liquid lubricant in the main channel 105 reaches the brim 108 of the main channel 105. With the embodiment illustrated in FIG. 13, the level of discharged lubricant in the main channel 605 can be maintained at a suitable level. As described in the previous embodiment illustrated in FIGS. 11 and 12, the orifice 609 can be in fluid communication with the liquid lubrication source, thereby allows the excess discharged lubricant from the main channel 105 to be recycled back into the liquid lubrication delivery system. Alternatively, the orifice 609 can be open to the ground to expel the excess discharged lubricant into the surrounding environment. While the illustrated embodiment in FIG. 13 shows the liquid leveler portion 600 having six outlets 601 with each outlet 601 having an orifice 609, one of ordinary skill in the art will appreciate that the liquid leveler portion 600 can have as few as one outlet 605 or more than six outlets 605. Additionally, one of ordinary skill in the art will appreciate that each outlet 605 does not require an orifice 609, so long as the liquid lever portion 600 has at least one orifice 609.

The illustrated embodiments of FIGS. 1-13 contemplate a cutting machine having a liquid lubrication delivery system having a work-piece platform 101 that can be moveable or stationary with respect to the cutting machine. For example, in one embodiment, the work-piece platform 101 can be stationary or fixed and the cutting machine 109 moves relative thereto as an operator guides the cutting machine 109 to travel across the work-piece platform 101. Alternatively, the work-piece platform 101 can be moveable with respect to the cutting machine 109 such that the cutting machine 109 remains stationary and the operator moves the work-piece platform 101 relative the cutting machine 109. Or, the work-piece platform 101 and the cutting tool can be fixed in relation to each other such that the operator rests the work-piece 103 on top of the work-piece platform 101 and feeds the work-piece 103 towards the cutting blade 107 of the cutting machine 109.

In other embodiments, the cutting machine 109 can be a tile saw, a miter saw, a masonry saw, a circular saw, or the like. The cutting machine 109 can also be a grinding machine.

Additional attachments can also be used in conjunction with the above described cutting machine 109 having a liquid lubrication delivery system to further control and prevent overspray. Such attachments can include but are not limited to a blade guard surrounding the cutting blade, splash curtains, water pans, or splash guards.

Operation of the cutting machine 109 having a liquid lubrication delivery system will now be described with respect to delivering water to the cutting blade 107 of a tile saw. One skilled in the art will appreciate that the following discussion is only an exemplary use of the above described liquid lubrication delivery system. Any type of coolant or lubricant can be used instead of water, and any type of cutting tool or grinding tool can be used instead of a tile saw. Furthermore, operation will be described with respect to the embodiment depicted in FIGS. 1, 5, and 6 in which there is a manifold 113 on each lengthwise side of the main channel 105 and there are a plurality of tapered lubrication inlets 111 serially spaced lengthwise along and at an angle to the main channel 105.

In operation, liquid lubrication is dispensed under pressure from a liquid lubrication source to the entry point 116 of the manifold 113 of the liquid delivery portion 100 of the cutting machine 109 having a prescribed liquid lubrication delivery system. The liquid lubrication source can be integrated into the cutting machine 109 or can be separate. The liquid delivery portion 100 is located at the upstream end 1000 of the main channel 105, which is opposite to the end of the main channel 105 where the cutting blade will enter. The manifold 113 of the liquid delivery portion 100 is of an optimal width such that the liquid lubrication can be pushed through the inlets 111 into the main channel 105 at a sufficient velocity. By virtue of fluid dynamics, the size, tapering, and orientation of the inlets 111 along the main channel 105 foster sufficient flow speed therein to provide an adequate sweeping flow of liquid lubrication through the main channel 105. In this exemplary embodiment, because the lubrication inlets 111 are tapered, positioned at an angle to the longitudinal axis of the main channel 105, and serially spaced lengthwise along the main channel 105, the pressurized liquid lubrication passes through an inlet 111 and contacts the opposing wall of the main channel 105, thereby dispersing the liquid lubrication to fill the main channel 105. Because the liquid lubrication is pressurized and constantly flowing through the inlets 111, the liquid lubrication flows through the main channel 105 and out an open end at the downstream end of the main channel 105. Also, because of this arrangement, the liquid lubrication only flows in one lengthwise direction down the main channel 105. The main channel 105 is dimensioned to contain the liquid lubrication within the main channel 105 and to maintain a substantially constant depth and velocity of liquid lubrication flowing through the main channel 105. When liquid lubrication is dispensed from a liquid lubrication source and moved into the main channel 105, liquid lubrication will be flowing through the main channel 105 before the cutting blade 107 enters the main channel 105.

Because the liquid lubrication is pressurized and constantly flowing through the inlets 111 the height of the resulting flow of liquid lubrication in the main channel 105 can potentially continue to rise and possibly spill over the brim 108 of the main channel 105. Referring to the embodiment of the liquid lubrication system illustrated in FIG. 12, the liquid lubrication system includes a liquid leveler portion 600 located at the downstream end 6000 of the main channel 105 that assists in maintaining a substantially constant depth and velocity of liquid lubrication flowing through the main channel 105. In the exemplary embodiment illustrated, the mouth 602 of the outlets 601 of the liquid leveler portion 600 is placed within a side 104, 106 of the main channel 105 proximate to the brim 108 of the main channel and above a predetermined height that is representative of the liquid lubrication level height that is to be maintained in the main channel 105. The outlets 605 of the liquid leveler 600 are of an optimal width and downwardly inclined such that the liquid lubrication will flow from the mouth 602 of the outlet 605 and into an orifice 609 fluidly connected to the outlet 605, when the level of liquid lubrication in the main channel 108 exceeds the predetermined height. Thus, when liquid lubrication in the main channel 105 approaches the mouth 602 of the outlet 601, the pressurized and constantly flowing liquid lubrication in the main channel 105, will push the liquid lubrication that reaches the mouth 602 of the outlet 601, through the mouth 602 and into the outlet 601. The excess liquid lubrication will then flow down the outlet 601, as a result of the downward incline, out of the outlet end 603 and into the outlet channel 605 fluidly connected to the outlet 601. Additionally, the downward incline (decline) provides a plenum for the liquid lubrication in the outlet 601, thereby drawing excess liquid lubrication in the main channel 105 that exceeds the predetermined liquid lubrication level away and out from the main channel and down towards the outlet channel 605. As the excess liquid lubrication accumulates in the outlet channel 605, the excess liquid lubrication is pushed down the outlet channel 605 towards the orifices 609 at the end of the outlet channel 605. The orifices 609 are open and in fluid communication with the liquid lubrication source. The openness of the orifices 609 creates a pressure difference between the atmospheric pressure above the outlet channel 105 and the atmospheric pressure beneath the orifice. As a result of fluid dynamics, the liquid lubrication within the outlet channel 105 is drawn to and through the orifice 609, thereby constantly draining the outlet channel 105. As the orifices are in fluid communication with the liquid lubrication source, the excess liquid lubrication from the main channel 105 is recycled back into the liquid lubrication system, thereby assuring enough liquid lubrication to fill the main channel 105 and enough liquid lubrication to pump through liquid lubrication system to maintain a constant velocity of liquid lubrication flow through the main channel 105. Additionally, the fluid communication between the liquid leveler portion 105 and the liquid lubrication source reduces the amount of wasted liquid lubrication.

When the operator is ready to cut a piece of tile 103, he places the tile 103 on top of the work-piece platform 101 such that a back edge of the piece of tile 103 abuts the backstop 118 of the work-piece platform 101. The operator then guides the work-piece platform 101 and tile 103 towards the cutting blade 107. As the platform 101 moves closer to the blade 107, the liquid lubrication flowing at the downstream end of the main channel 105 comes into contact with the blade 107 to begin cooling the blade. Then, as the tile 103 approaches the blade 107, the tile 103 is cut, and the liquid lubrication in the main channel 106, which is now below the tile 103, flows across the blade 107 and continues to cool the blade 107 as the tile 103 is cut. Because the liquid lubrication is below the tile 103 and the lubrication inlets 111 are positioned to direct a constant flow of liquid lubrication down the main channel 105, liquid lubrication that would normally have been directed upwards and onto the tile 103 by the centrifugal force of the spinning blade 107 is diminished. Also, because the flow of liquid lubrication is in generally in one direction down the main channel away from the operator, any liquid lubrication or overspray that would typically have been sprayed onto the operator and his work area is diminished. Dust or debris that results from cutting tile 103 is also reduced because the constant flow of liquid lubrication in the main channel 105 takes on and pushes such dust and debris downstream of the main channel 105 and out the open end of the main channel 105.

In at least one embodiment, a method of supplying liquid lubrication is contemplated herein. The method includes providing a work-piece platform to support a work-piece. The work-piece platform can be configured as described above and includes at least a main channel defining a recess in an upper surface of the work-piece platform. The method further includes discharging liquid lubrication through at least one liquid lubrication inlet having a discharge opening within the main channel. In some embodiments, the liquid lubrication can additionally be discharged through the above described components. For example, the method can include discharging liquid lubrication through a manifold fluidly connected to the discharge opening within the main channel. The liquid lubrication can be discharged through the at least one liquid lubrication inlet at a longitudinal axis oriented at an angle to the longitudinal axis of the main channel as described above. The arrangement of the discharge openings can be as described above wherein a plurality of discharge openings are provided. The liquid lubrication can flow down the main channel as described above. The flow in the main channel is such that it allows for wetting and cooling of the cutting tool as it passes through the liquid lubrication in the main channel.

Additionally, the present disclosure contemplates a method of leveling cutting fluid within the main channel of the work-platform of a cutting machine. The work platform can be as described above or in the form of other embodiments that are compatible with the method as described herein. The liquid lubrication can be supplied to the main channel using the above described method or other method as contained herein. The liquid lubrication in the main channel can be evacuated through at least one outlet recessed into the upper surface of the work-piece platform at a downstream end of the main channel. The evacuating of the liquid lubrication can be through a drain fluidly connected to the at least one outlet, wherein the drain is located adjacent to the first side or the second side of the main channel and a predetermined distance from the first side or the second side. Additionally, the evacuation of the fluid provides a leveling mechanism whereby the liquid lubrication is leveled within the main channel through the use of the method as presented herein. Other elements used in the evacuation of the main channel can be as described above especially in relation to the description of the flow of fluid within the main channel.

Figure 14:
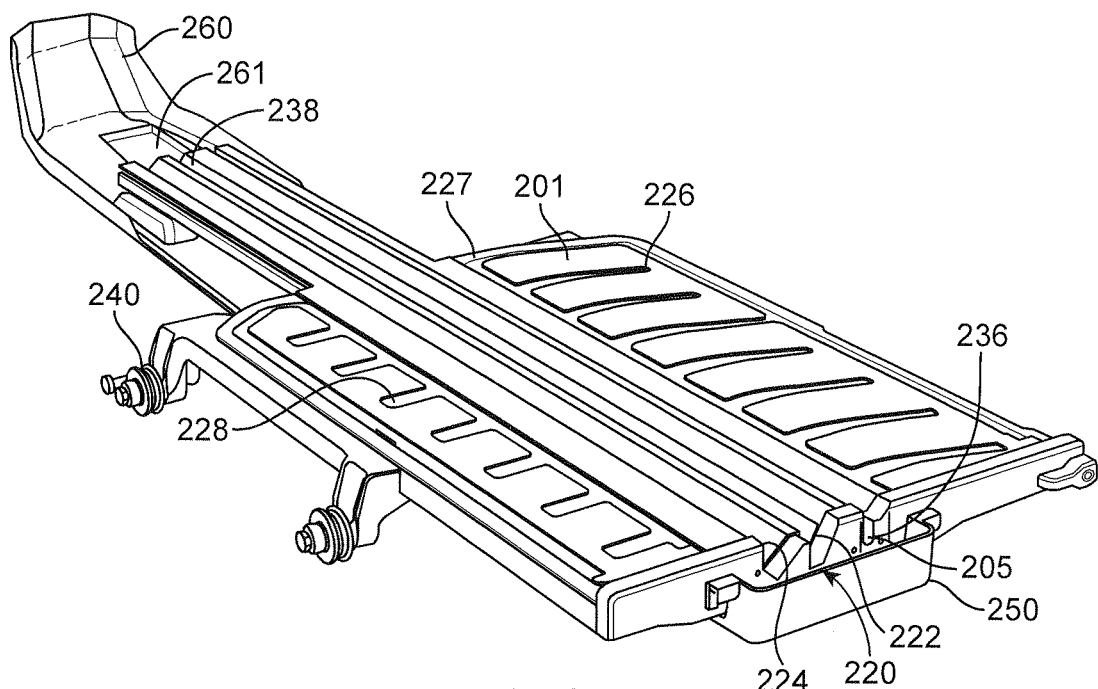
FIG. 14 is a perspective view of a work-piece platform according to one example in accordance with the present disclosure.

Another example of a work-piece platform 201 in accordance with the present disclosure is illustrated in FIG. 14. The work-piece platform 201 includes a main channel 205. The work-piece platform 201 can also include auxiliary channels 220. Two auxiliary channels 220 are illustrated in FIG. 14. As illustrated, there is a first auxiliary channel 222 which is closer to the main channel than the second auxiliary channel 224. The auxiliary channels 220 are substantially parallel to the main channel 205. In at least one implementation the auxiliary channels can include the features of the main channel 205 as described herein. As illustrated, the auxiliary channels are formed without all of the features of the main channel as described herein. The work-piece platform also includes an upper surface 227. The upper surface 227 can include grooves (226, 228). As illustrated the grooves (226, 228) include a right set of grooves 226 and a left set of grooves 228. The portion of the work-piece platform 201 that is to the right of the main channel 205 has a larger surface area than the portion of the work-piece platform 201 that is to the left of the main channel 205. The right channels 226 can be longer than the left channels 228. The left channels 228 can be wider than the right channels. In other implementations, the shape of the left and right channels can be the same. Additionally, the work-piece platform 201 can be shaped to be substantially the same size on either side of the main channel 205. In the illustrated implementation, where the work-piece platform 201 is sized such that one side of platform 201 is larger than the other, it provides for a reduce size of the work-piece platform 201 and thereby reducing the cost associated with constructing the work-piece platform 201. As illustrated, the saw motor could be positioned such that it overhangs the large of the two portions of the work-piece platform 201. This configuration further reduces the overall size of the tile saw by making the size of the unit as compact as possible while retaining an appropriately size work-piece platform 201 to handle tiles at least twenty-two or twenty-four inches across. In other embodiments, the work-piece platform 201 can be sized to accommodate twelve or thirteen inch tiles. Additionally, the work-piece platform 201 can be sized to accommodate thirty-six inch tiles. In order to accommodate tiles of sizes larger than the work-piece platform than is standard, the work-piece platform can further include an expansion adapter to accommodate tiles of larger sizes. While tile is used herein, it should be understood that other objects could be cut using the system as presented herein.

The work-piece platform can include wheels 240 to rollingly engage with tracks. The wheels 240 can be sized to fit a corresponding track. A fluid collector 250 can also be included. The fluid collector 250 collects water as it exits out of the main channel 205 at a first end 236. A splash guard 260 can be located at the second end 238 of the main channel 205. The splash guard 260 reduces the amount of fluid that is slung in the area surrounding the title saw. The splash guard 260 has a raised end that is above the upper surface of the work-piece platform 201. The raised end of the splash guard 260 further serves to limit the amount of fluid that is slung beyond the work-piece platform 201. The splash guard 260 is also part of a fluid recovery system that directs the fluid towards a fluid receptacle. The splash guard 260 can include a recessed portion 261 that is located adjacent the main channel. The recessed portion 261 accommodates the greater flow of fluid out of the second end 238 of the main channel 205.

Figure 15:
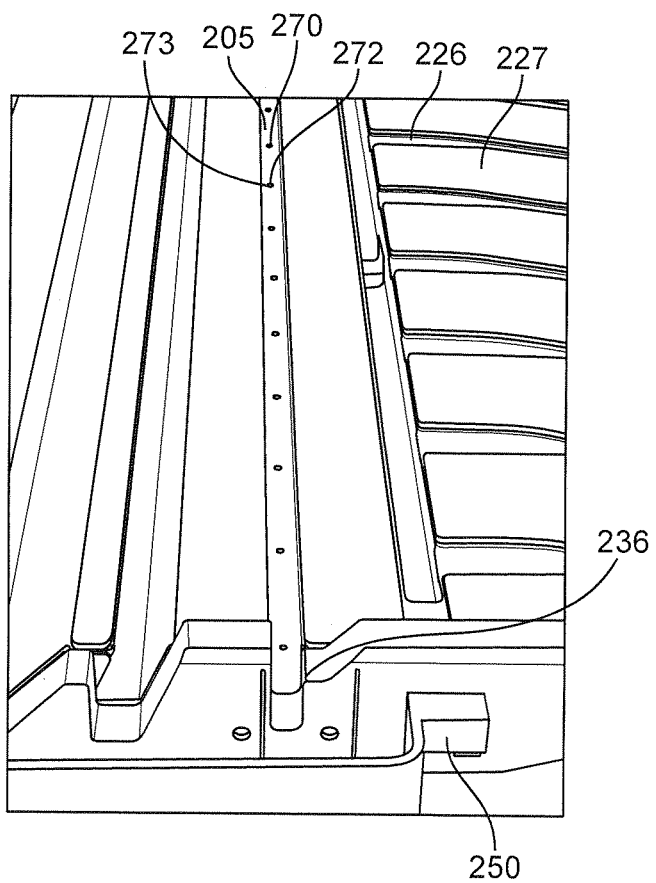
FIG. 15 is a perspective view of a main channel of the work-piece platform of FIG. 14 having an inlet sheet in accordance with the present disclosure.

FIG. 15 illustrates a top perspective view of a work-piece platform 201 including a main channel 205 having an inlet sheet 270 (shown in FIG. 17) according to an illustrative implementation. The inlet sheet 270 has at least one liquid lubrication inlet 272. The liquid lubrication inlet 272 as illustrated is a through-hole 273. The liquid lubrication inlet 272 fluidly couples a pressurized channel 274 to the main channel 205. As indicated above, excess fluid in the main channel 205 can exit out a first end 236 or a second end 238. In other embodiments additional drain channels can be implemented to adjust the amount of fluid in the main channel 205. The fluid that exits out of the main channel 205 at first end 236 is recovered by the fluid collector 250. The fluid that exits out of the second end (not shown in FIG. 15) of the main channel 205 is recovered by the splash guard (not shown in FIG. 16).

Figure 16:
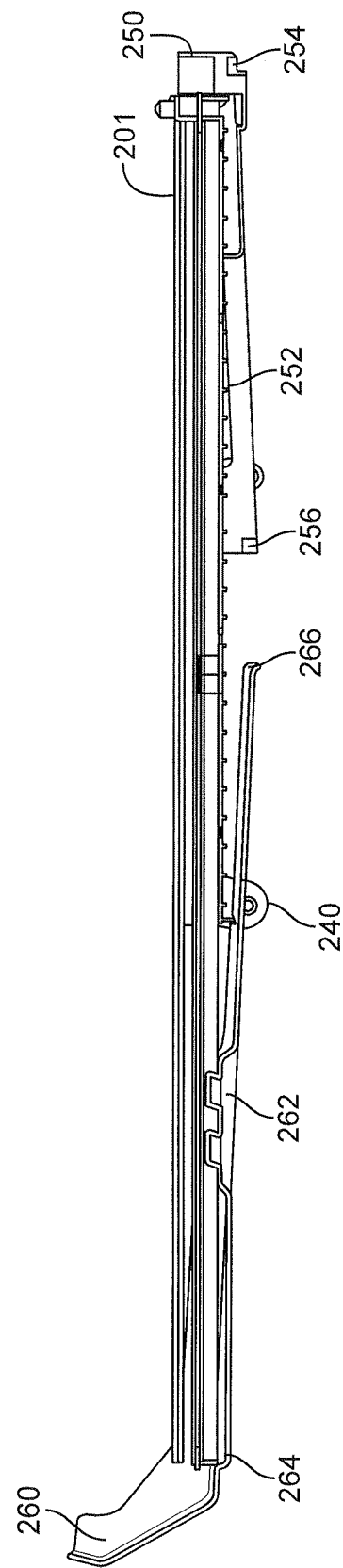
FIG. 16 is a side elevation view of the work-piece platform of FIG. 14 in accordance with an exemplary embodiment.

FIG. 16 illustrates a cross-section view of an exemplary implementation of the present technology. As illustrated, the work-piece platform 201 can include a splash guard 260 and a fluid collector 250. In other implementations, the work-piece platform 201 can include only one of the splash guard 260 or fluid collector 250. In still other implementations, neither the splash guard 260 nor the fluid collector 250 can be included. In the illustrated embodiment, the fluid collector 250 includes a fluid collector body 252 having a first end 254 and a second end 256. The first end 254 of the fluid collector 250 extends beyond the end of the main channel 205, thereby allowing the fluid collector 250 to capture fluid exiting the main channel 250. The second end 256 of the fluid collector 250 allows for fluid to be dumped into a fluid receptacle. The first end 254 is located closer to the upper surface of the work-piece platform as compared to the second end 256. Therefore, the fluid collector body 252 slopes downwardly from a first end 254 to a second end 256. While the bottom of the fluid collector body 252 can be level, the inner surface of the fluid collector body 252 is sloped so as to allow the fluid to drain from the first end 254 to the second end 256 due to gravity.

As illustrated, the splash guard 260 includes a splash guard body 262 having a first end 264 and a second end 266. In at least one embodiment, the splash guard 260 can be moveable with respect to the work-piece platform 201. For example, the splash guard 260 can be slidingly engaged with the channel support structure 276 so as to allow the splash guard 260 to slide. In another embodiment, the splash guard 260 can be slidingly engaged with the work-piece platform 201 so as to allow the splash guard 260 to slide. For example, for a standard work-piece, the splash guard 260 can be positioned relative to the work-piece platform 201 in a first position such that the first end 264 is located proximate to an end of the work-piece platform. In the first position, the splash guard 260 fully retracted and allows for a compact configuration. This compact configuration allows the work-piece platform 201 to be moved including for shipping. In at least one implementation, the splash guard 260 can be fixably attached prior to shipping to a consumer. In other embodiments, the splash guard 260 can be assembled by the consumer.

The splash guard 260 can also be moved to an extended configuration so that the first end 264 is positioned away from the end of the work-piece platform 201. In this extended configuration, the splash guard 260 allows a larger work-piece to be placed on the work-piece platform 201.

The splash guard 260 as illustrated can also serve to collect fluid and drain the fluid collected into the fluid receptacle located beneath the work-piece platform 201. The first end 264 of the splash guard can be configured such that it is closer to the upper surface of work-piece platform 201 then the second end 266, thereby allowing fluid to drain from the first end 264 to the second end 266. Fluid exits the second end 266 of the splash guard 260.

Figure 17:
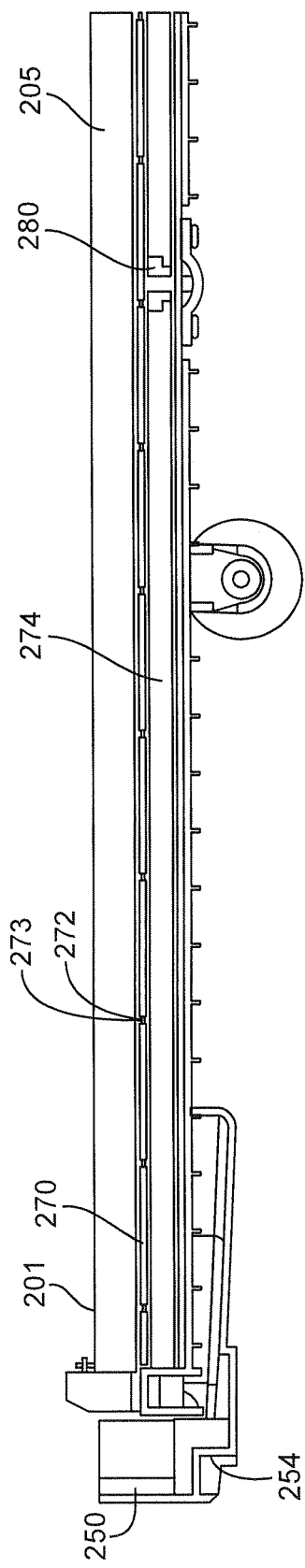
FIG. 17 is a cross-section view of the work-piece platform including a pressurized channel and an inlet sheet in accordance with an exemplary embodiment.

FIG. 17 illustrates a cross-sectional view of the work-piece platform 201. The cross-section illustrates the pressurized channel 274 positioned below the main channel 205. In other embodiments, the pressurized channel 274 can be located substantially adjacent the main channel. For example, the pressurized channel 274 can be located on one of a left side of the main channel 205, a right side of the main channel 205, beneath the main channel 205 or at a diagonal position relative to the main channel 205. The pressurized channel 274 is fluidly coupled to the main channel 205 via liquid lubrication inlets 272. In the illustrated implementation, the plurality of liquid lubrication inlets is spaced equidistant along a length of the main channel 205. In other implementations, the spacing can be non-uniform as well. The liquid lubrication inlets 272 can be through-holes 273. The through-holes 273 can be serially spaced apart along the main channel 205. In other embodiments, the through-holes 272 can be spaced apart in a non-uniform spacing. For example, the through-holes 272 can be spaced closer towards the first end 236 of the main channel 205 and the second end 238 of the main channel 205. Fluid is supplied to the pressurized channel 274 via an inlet nozzle 280. The inlet nozzle 280 can be positioned substantially in the middle of the pressurized channel 274. Additional details regarding the inlet nozzle 280 will be described herein.

Figure 18:
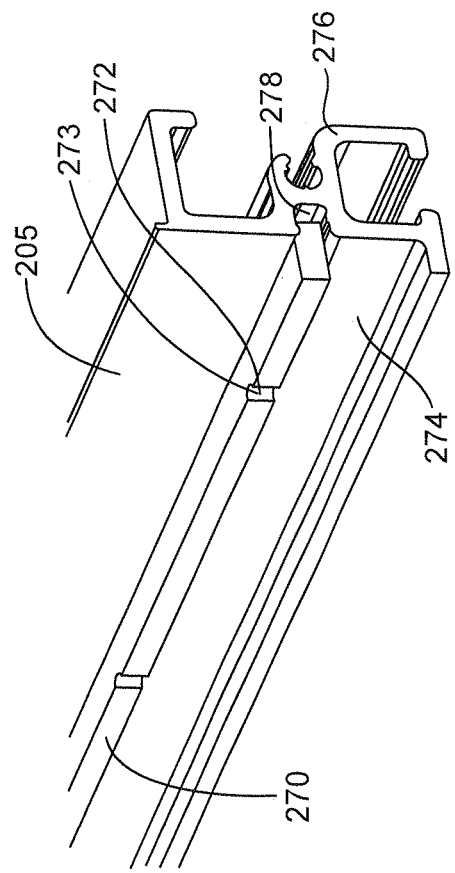
FIG. 18 is a partial perspective cross-sectional view of a main channel, a pressurized channel and inlet sheet according to an exemplary embodiment.

FIG. 18 illustrates a perspective cross-sectional view of main channel 205, pressurized channel 274 and channel support structure 276. The channel support structure 276 provides support to the inlet sheet 270. In at least one implementation, the inlet sheet 270 can be removed from the channel support structure 276. When the inlet sheet 270 can be removed, the pressurized channel 274 and the inlet sheet 270 can be cleaned. The fluid can have particles that are the result of the cutting process and occasional cleaning can provide increased flow performance. The inlet sheet 270 and liquid lubrication inlets 272 can control the amount of fluid in the main channel 205 in conjunction with the pressure supplied from a pump 275 which supplies the fluid from the fluid receptacle to inlet nozzle 280 to pressurized channel 274.

Figure 19:
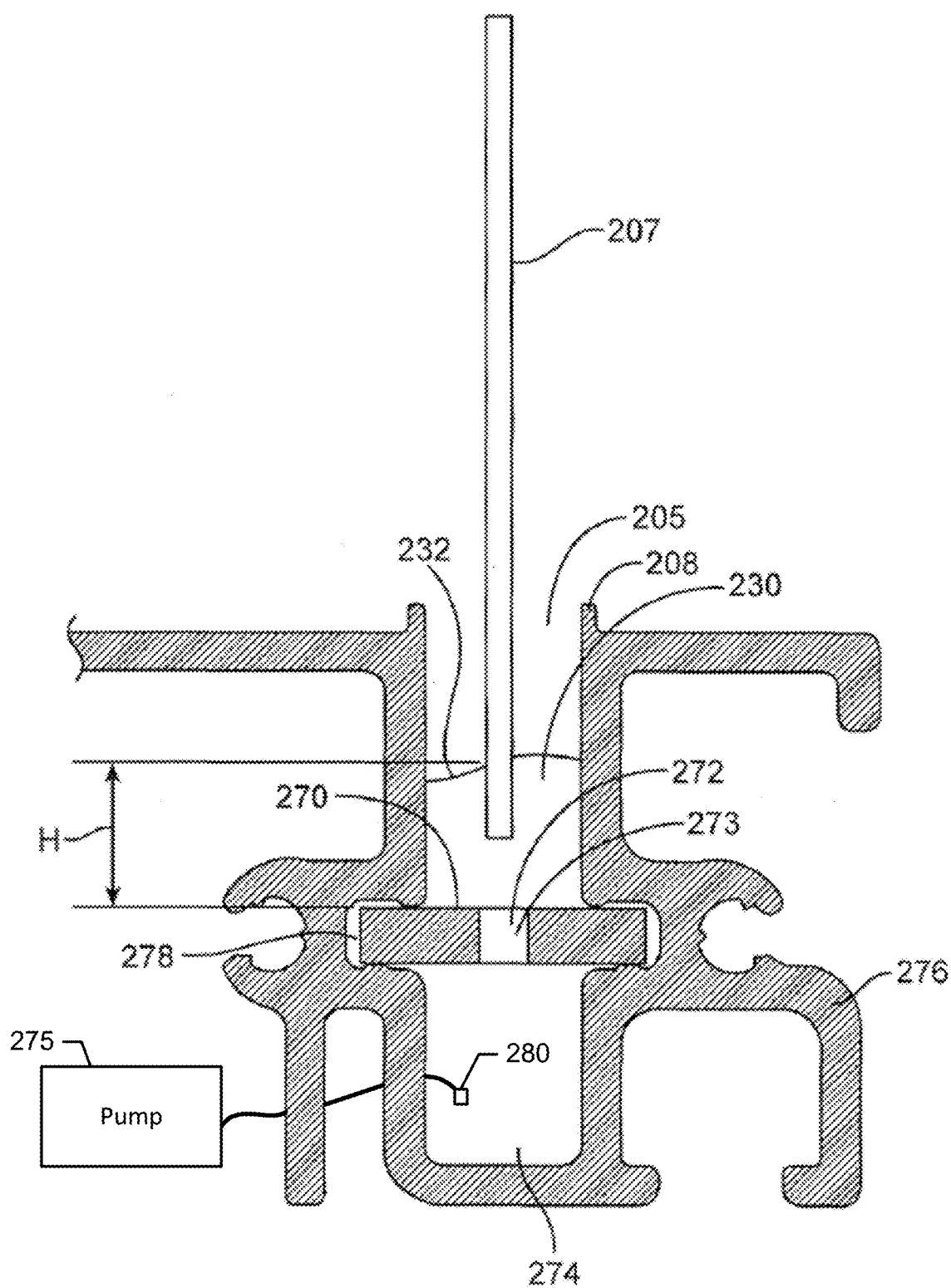
FIG. 19 is cross-sectional view of a main channel, a pressurized channel, inlet sheet and channel support structure according to an exemplary embodiment.

FIG. 19 illustrates an example of a cross-section view of the main channel 205, pressurized channel 274, inlet sheet 270, and channel support structure 276. In the illustrated example, the inlet sheet 270 is positioned within an inlet sheet accommodation structure 278. The inlet sheet accommodation structure 278 as illustrated allows the inlet sheet 270 to be slidingly engaged therewithin. If the liquid lubrication inlets 272 become blocked or otherwise restricted, the inlet sheet 270 can be removed from the inlet sheet accommodation structure 278. In at least one implementation, the inlet sheet 270 can be removed by a consumer using only his or her hands. In other implementations, the inlet sheet 270 can be affixed to the inlet sheet accommodation structure 278 and require one or more affixment mechanisms to be disengaged. Additionally, the channel support structure 276 is illustrated. The channel support structure 276 can form both the main channel 205 and pressurized channel 274. As illustrated, the channel support structure 276 is an extruded shape. Forming the channel support structure 276 using the extrusion process allows for controlling the shapes and sizes of the pressurized channel 274, inlet sheet accommodation structure 278, and the main channel 205. For example, the extrusion process can allow a brim 208 to be formed for the main channel 205 to contain the fluid within the main channel 205.

As illustrated, the liquid lubrication inlet 272 is in the form of a through-hole 273. The through-hole has a substantially uniform diameter. In other implementations, the through-hole can have a non-uniform diameter, for example the through-hole can be tapered, form an expansion nozzle, form an acceleration nozzle or the like.

The blade 207 is illustrated in the main channel 205 such that a circumference of the blade 207 touches the fluid 230 within the main channel 205. The fluid 230 in the main channel 205 has a fluid level 232. As indicated above, the fluid level 232 can change along the main channel 205, but in at least one embodiment has a height (H) that permits the perimeter of the blade 207 to touch the fluid 230. The fluid height (H) can be adjusted using pump pressure which in turn controls the pressure within main channel 205 thereby controlling the fluid flowing out of the liquid lubrication inlets 272.

In other implementations, the pressurized channel 274 and inlet sheet 270 can be configured to act as a nozzle sheet so as to direct fluid directly to the blade 207 while only a small amount of fluid is in the main channel 205. In at least one implementation, the height (H) of the fluid 230 in the main channel 205 can be less than that required to touch the perimeter of the blade 207. In at least one embodiment, the blade 207 can be partially submerged in the fluid 230.

Figure 20:
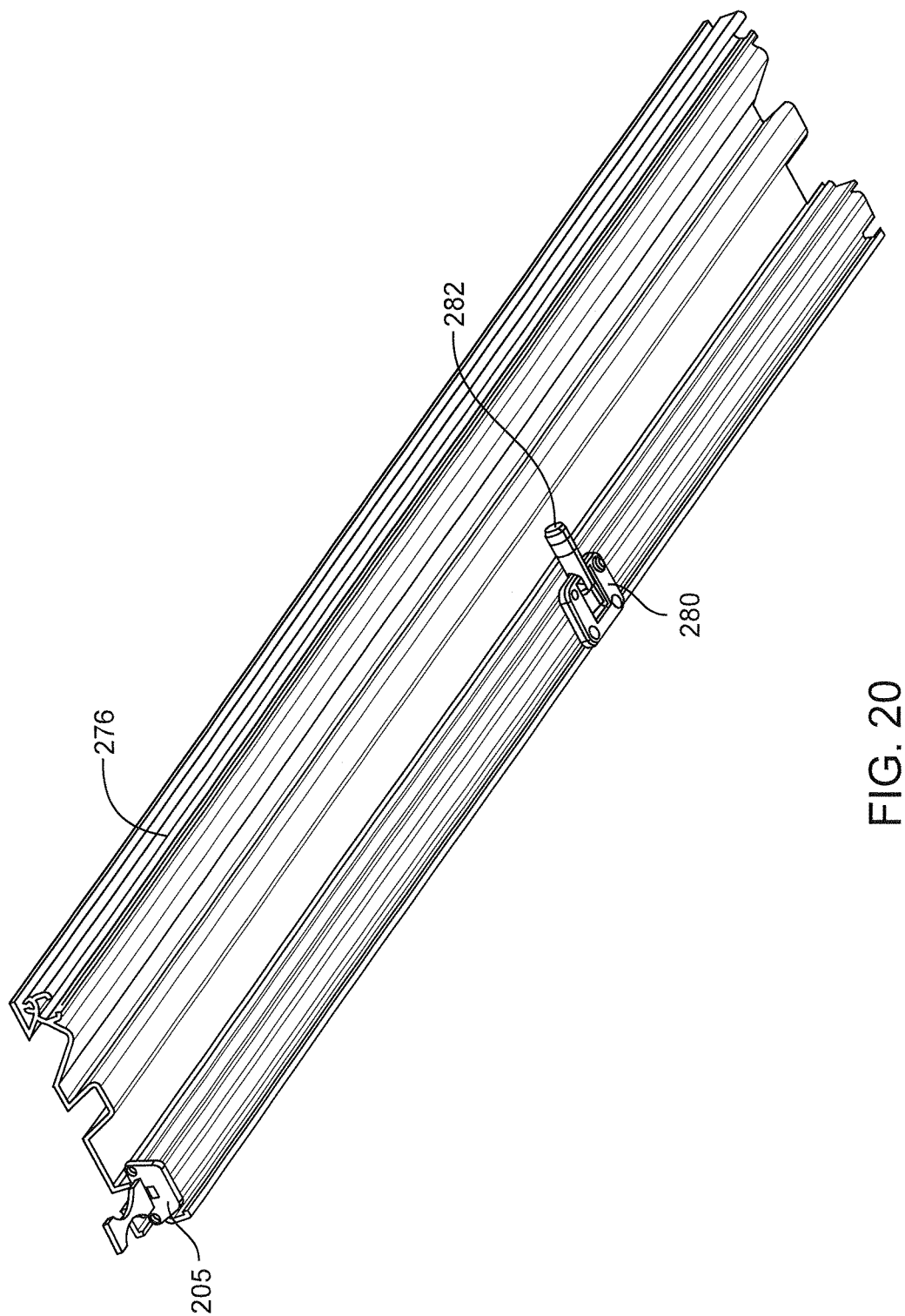
FIG. 20 is a lower perspective view of a plurality of channels inkling one with an inlet nozzle in accordance with an exemplary embodiment.

FIG. 20 illustrates the inlet nozzle 280 mounted to the channel support structure 276. The inlet nozzle 280 has a coupler 282 that couples the inlet nozzle 280 to a pressure pump for supplying fluid to the inlet nozzle 280.

Figure 21:
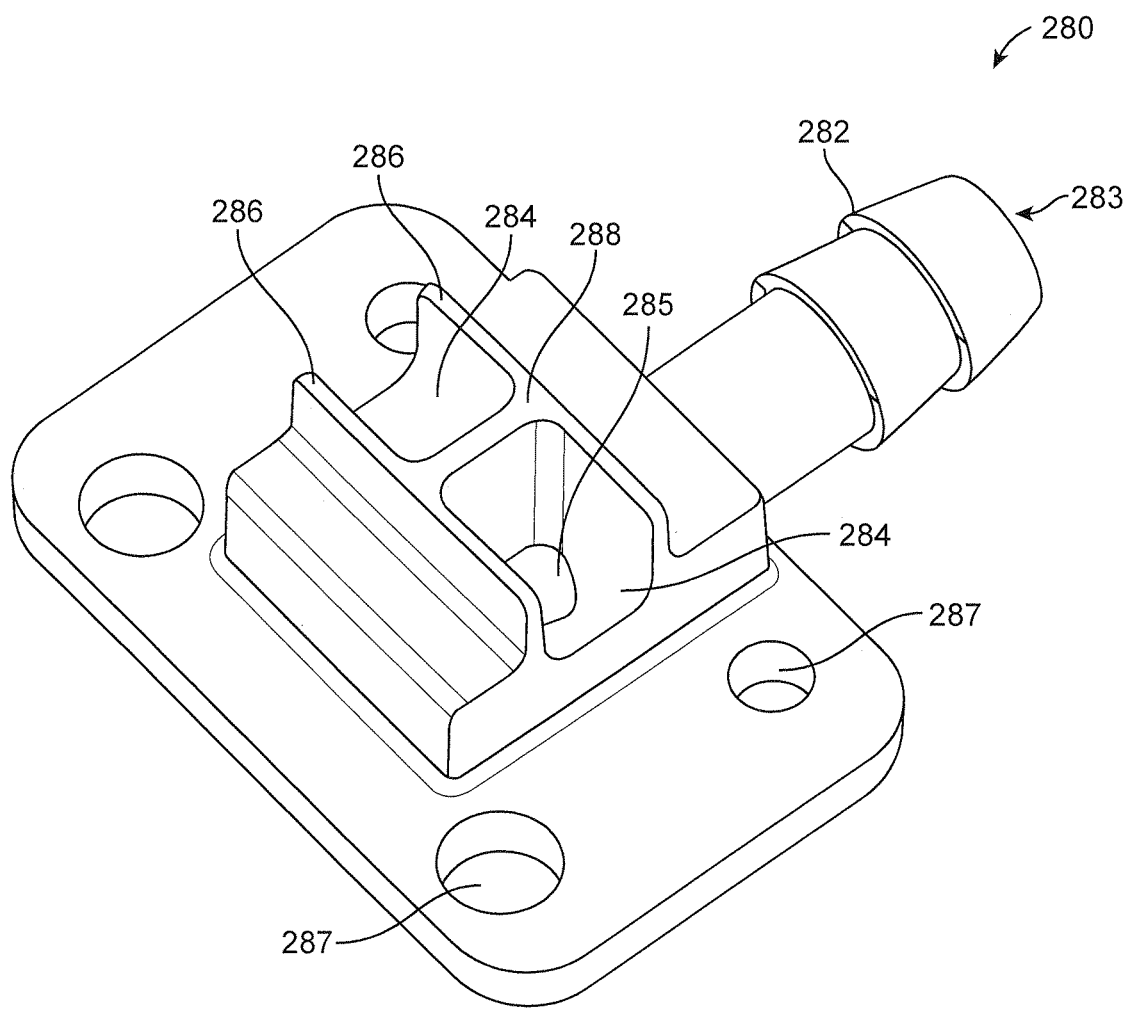
FIG. 21 is a perspective view of the inlet nozzle in accordance with an exemplary embodiment.

FIG. 21 illustrates a perspective view an exemplary inlet nozzle 280. Fluid enters the inlet nozzle through an inlet 283 of the inlet nozzle 280 in the inlet nozzle coupler 282. The fluid is split by the inlet nozzle 280 so that a portion of the fluid exits through the outlet 284 of the inlet nozzle 280. As illustrated, there are two outlets 284 of the inlet nozzle 280. As illustrated, each outlet 284 comprises an outlet orifice 285. The outlet orifice 285 controls the amount of fluid and pressure of the fluid entering the pressurized channel 274. The inlet nozzle 280 as illustrated allows for dividing the pressurized channel 274 into two separate channels. The inlet nozzle partition 288 divides the pressurized channel 274 essentially into two channels because the inlet nozzle partition 288 is sized such that the top of the inlet nozzle partition 288 is substantially even with the top of the pressurized channel 274. The inlet nozzle 280 further can further includes inlet nozzle side walls 286. The inlet nozzle side walls 286 can further provide for fluid flow direction control and strengthening of the pressurized channel 274 in the area surrounding the fluid inlet nozzle 280.

Figure 22:
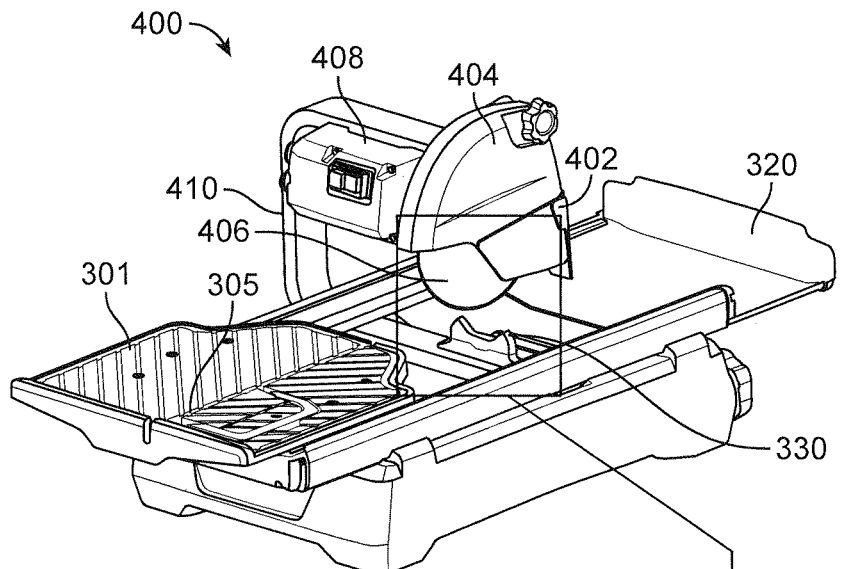
FIG. 22 is a perspective view of a tile saw in accordance with an exemplary embodiment.

FIGS. 22-28 illustrate additional examples wherein the fluid is supplied beneath the saw blade 406. As illustrated in FIG. 22, the saw 400 includes a saw motor 408 and saw motor support arm 410. A blade guard 404 surrounds the top portion of the blade 406. A blade splash guard 402 reduces the splash from the fluid being slung by the blade 406. Fluid is supplied to the blade 406 by a fluid nozzle 330 that is mounted to the saw beneath the work-piece platform 301. The fluid nozzle 330 can be fixed in relation to the blade 406. As shown the nozzle can be mounted on a cross-member portion 376. The fluid nozzle 330 directs fluid so that the fluid impacts the blade 406. The work-piece platform 301 is configured to allow the fluid from the fluid nozzle 330 to reach the blade 406.

Figure 23:
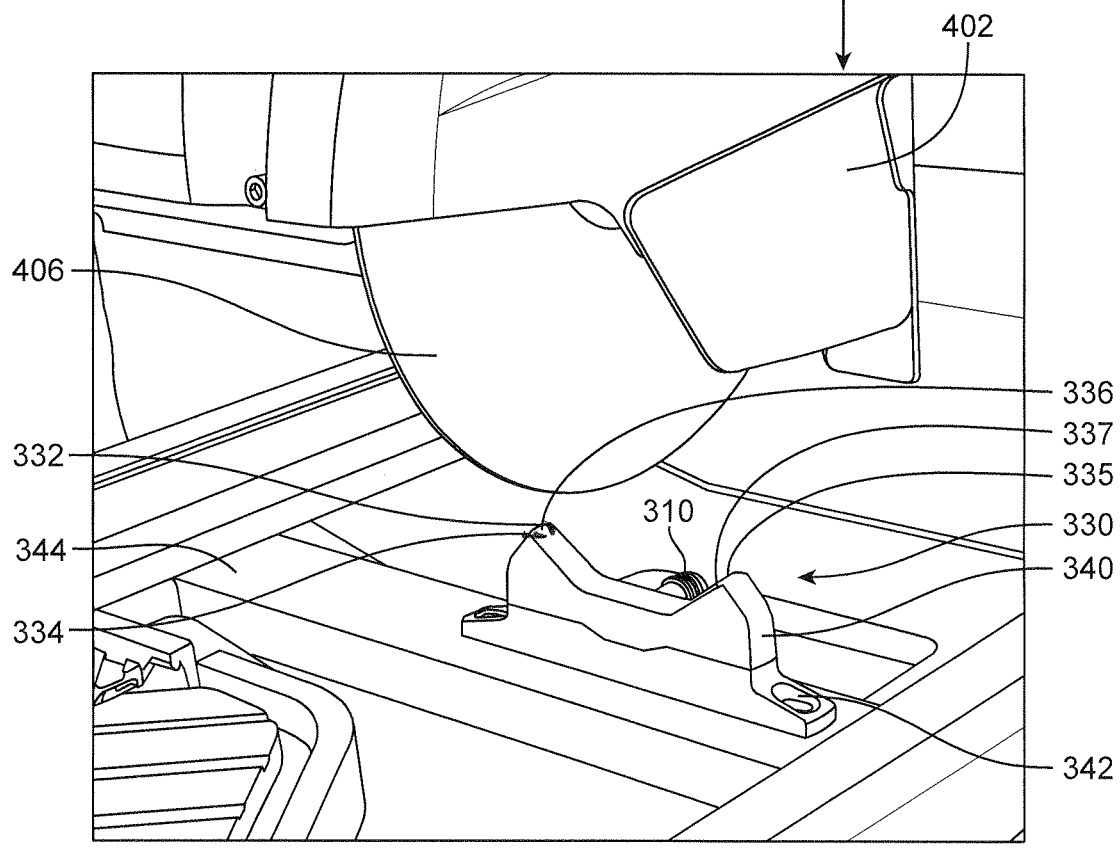
FIG. 23 is a detailed view of a saw and water nozzle in accordance with an exemplary embodiment.

FIG. 23 illustrates a detailed view of the fluid nozzle 330 in accordance with one example. This example is provided for illustrative purposes and modification of the nozzle 330 is possible. The illustrated nozzle 330 has a plurality of outlet nozzles 332 including a first left outlet nozzle 334, a second left outlet nozzle 336, a first right outlet nozzle 335, and a second right outlet nozzle 337. The plurality of outlet nozzles 332 allow for the fluid to better contact the blade 406. When a plurality of outlet nozzles 332 are implemented as shown, the amount of fluid reaching the blade 406 is increased. In at least one implementation such as the one illustrated, the plurality of outlet nozzles 332 can be angled such that fluid exiting the nozzle impacts the blade. Additionally, in at least one implementation, the nozzle shape can be configured to wet the perimeter of the blade 406 and a radially inward portion of the blade 406. In other implementations, only a single outlet nozzle 332 can be used. In yet another implementation, the plurality of outlet nozzles 332 can be configured such that one nozzle is located on the right side and one is located on the left. In yet another implementation, two outlet nozzles can be positioned directly beneath the blade 406, so that when the nozzle sprays in a vertical orientation it would impinge upon the blade.

The fluid enters the fluid nozzle 330 from a fluid nozzle coupler 310. The fluid nozzle coupler 310 is fluidly coupled to a pump (not shown). The fluid nozzle 330 can include a fluid nozzle structure 340 in which the at least one outlet nozzle 332 is located. Additionally, the fluid nozzle 330 can include a fluid nozzle mount portion 342. The fluid nozzle mount portion 342 is configured to be mounted to at least one support frame 344 of the saw 400. The fluid nozzle mount portion 342 and at least one support frame 344 can be configured to allow the position of the fluid nozzle 330 to be variably positioned in one or more directions.

Figure 24:
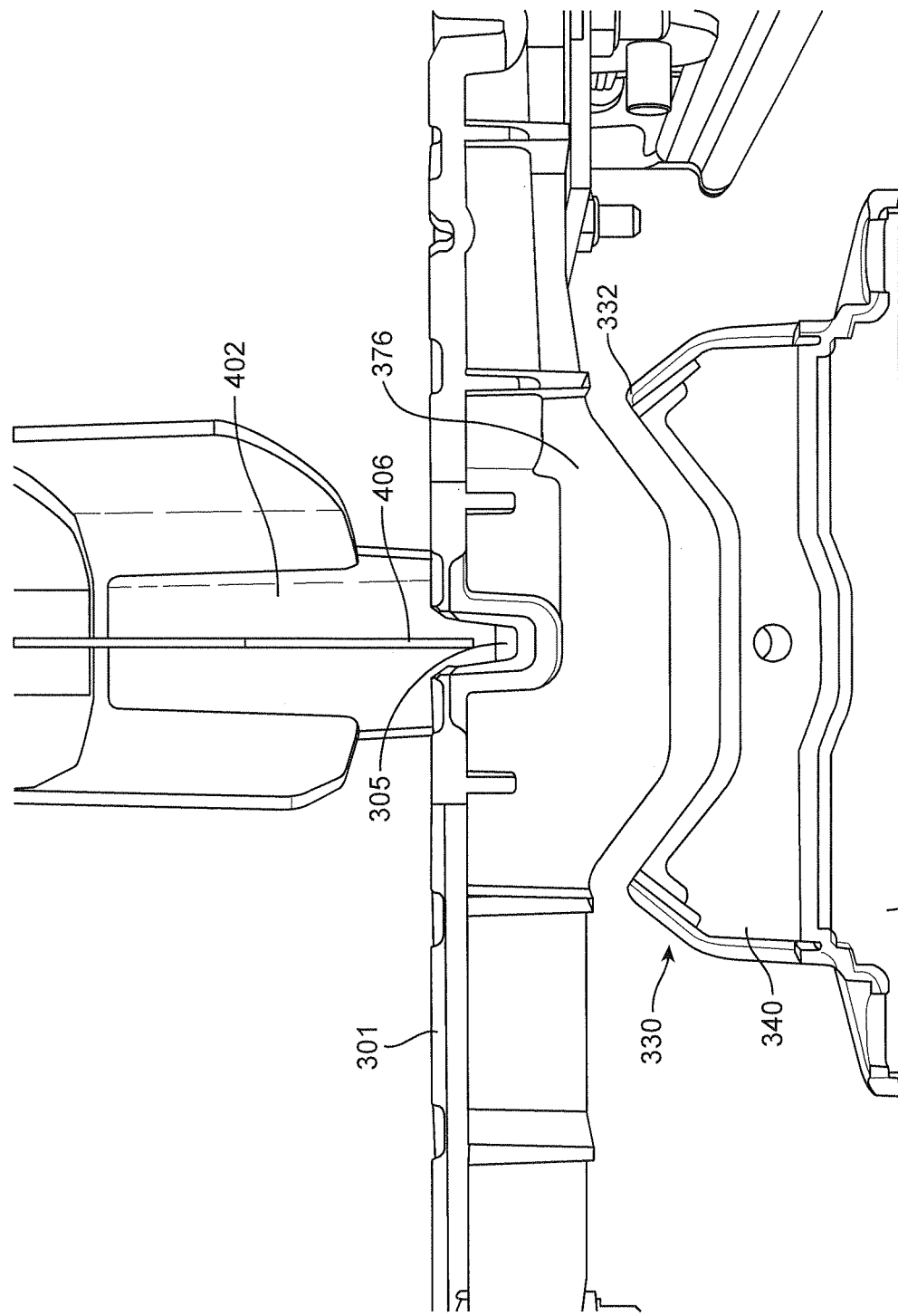
FIG. 24 is an elevational cross-section view of a saw, work-piece platform and water nozzle of an exemplary embodiment.

FIG. 24 illustrates a cross-sectional view of the saw 400 including a blade splash guard 402, blade 406, work-piece platform 301, and fluid nozzle 330. As illustrated the work-piece platform 301 has a cross-member portion 376. The cross-member portion 376 is used to strengthen the work-piece platform 301 based on the apertures provided there-though, thereby allowing fluid exiting the outlet nozzles to impinge upon the blade 406. Examples of the apertures are explained below in relation to FIGS. 25-28.

Figure 25:
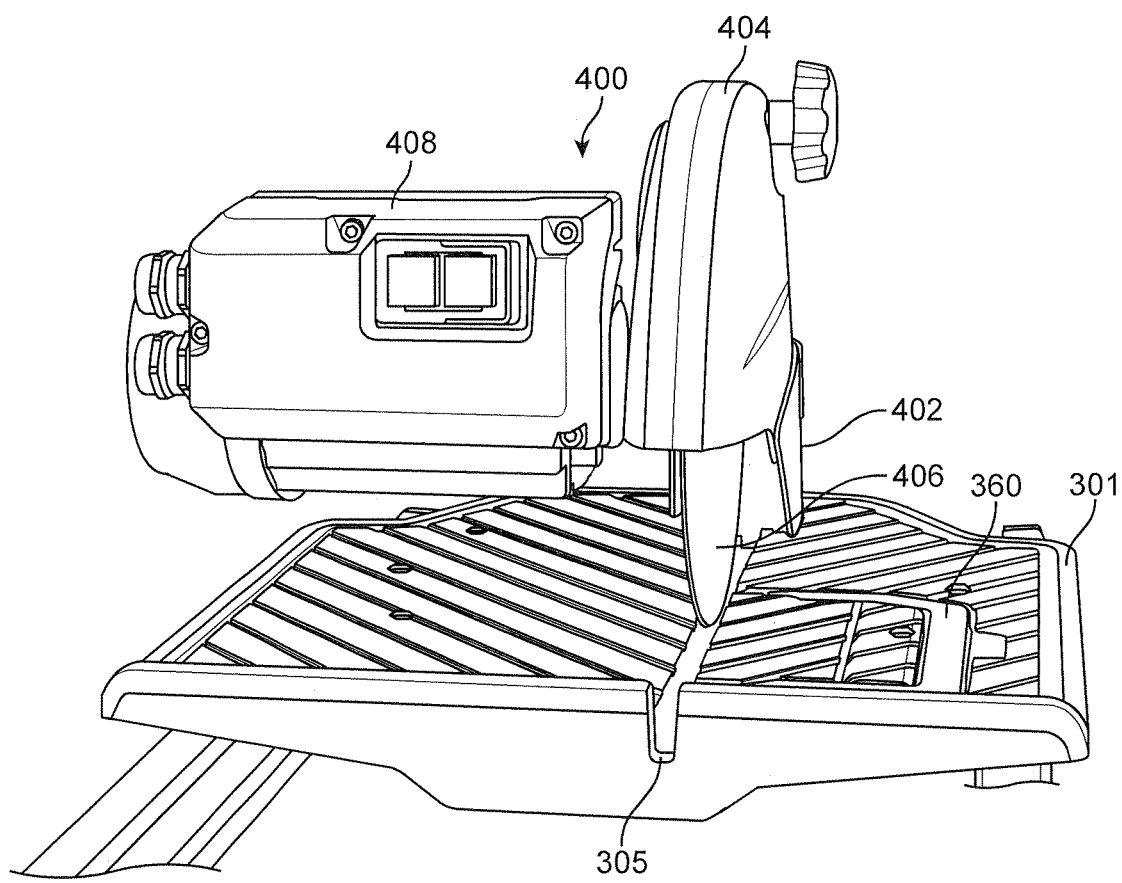
FIG. 25 is a perspective view of the saw with the blade positioned in the main channel in accordance with an exemplary embodiment.

In the example of FIG. 25, the main channel 305 accommodates fluid being sprayed directly from below as well as from the sides of the blade 406. When the blade 406 is sprayed from the side the amount of fluid contacting and interacting with the blade 406 can be increased. The work-piece platform 301 further includes a support device 360. The support device is used in conjunction with plates so that a work-piece can be cut at different angles. For example, the work-piece can be cut at 22.5 and 45 degree angles.

Figure 26:
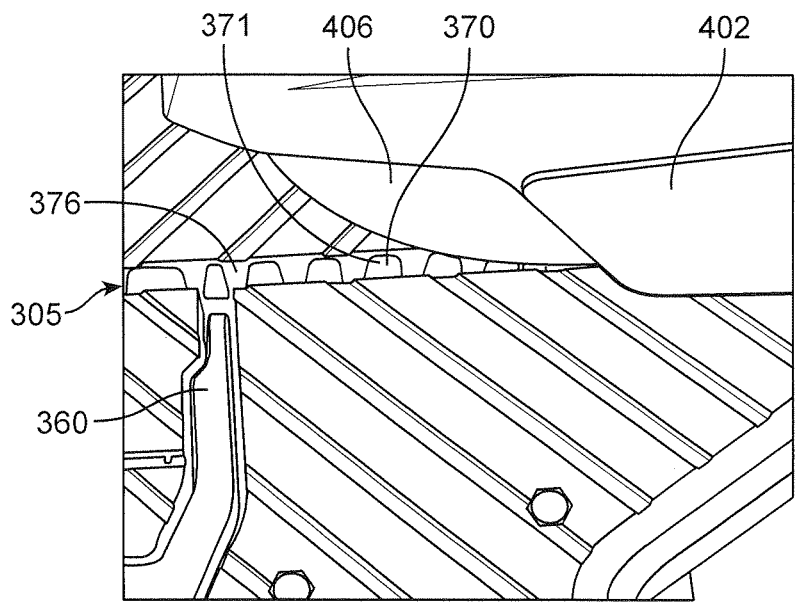
FIG. 26 is a detailed perspective view of the blade of the saw in the main channel having work-piece inlet apertures in accordance with an exemplary embodiment.
Figure 27:
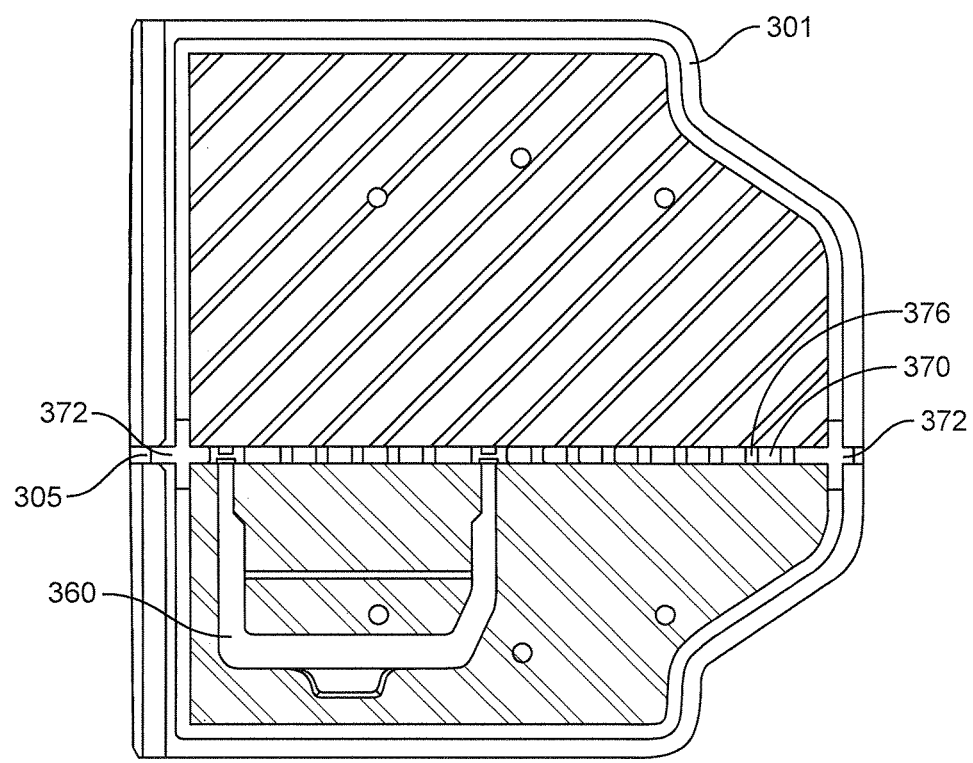
FIG. 27 is a plan view of the work-piece platform in accordance with an exemplary embodiment.

FIGS. 26-27 illustrate an example of a work-piece platform 301 having a plurality of liquid lubrication inlets 370 in the form of work-piece platform inlet apertures 371. The work-piece inlet apertures are formed between adjacent cross-member portions 376 that provide further rigidity to the work-piece platform 301. The spacing between cross-member portions 376 can be such that the amount of fluid allowed through the work-piece platform inlet apertures 371 is maximized. In at least one implementation, the work-piece platform inlet apertures 371 can be further shaped and configured to maximize the fluid impinging upon the blade 406. For example, the work-piece platform inlet apertures 371 can be shaped so as to direct the fluid towards the blade 406. In at least one implementation, as indicated above, the cross-member portions 376 can be eliminated. FIG. 27 further illustrates work-piece end inlet apertures 372. The work-piece end inlet apertures 372 can also serve as a drain for the work-piece platform. As illustrated the work-piece end inlet apertures 372 can also extend laterally beyond the extent of the main channel 305, thereby serving as a drain to other portions of the work-piece platform 301.

Figure 28:
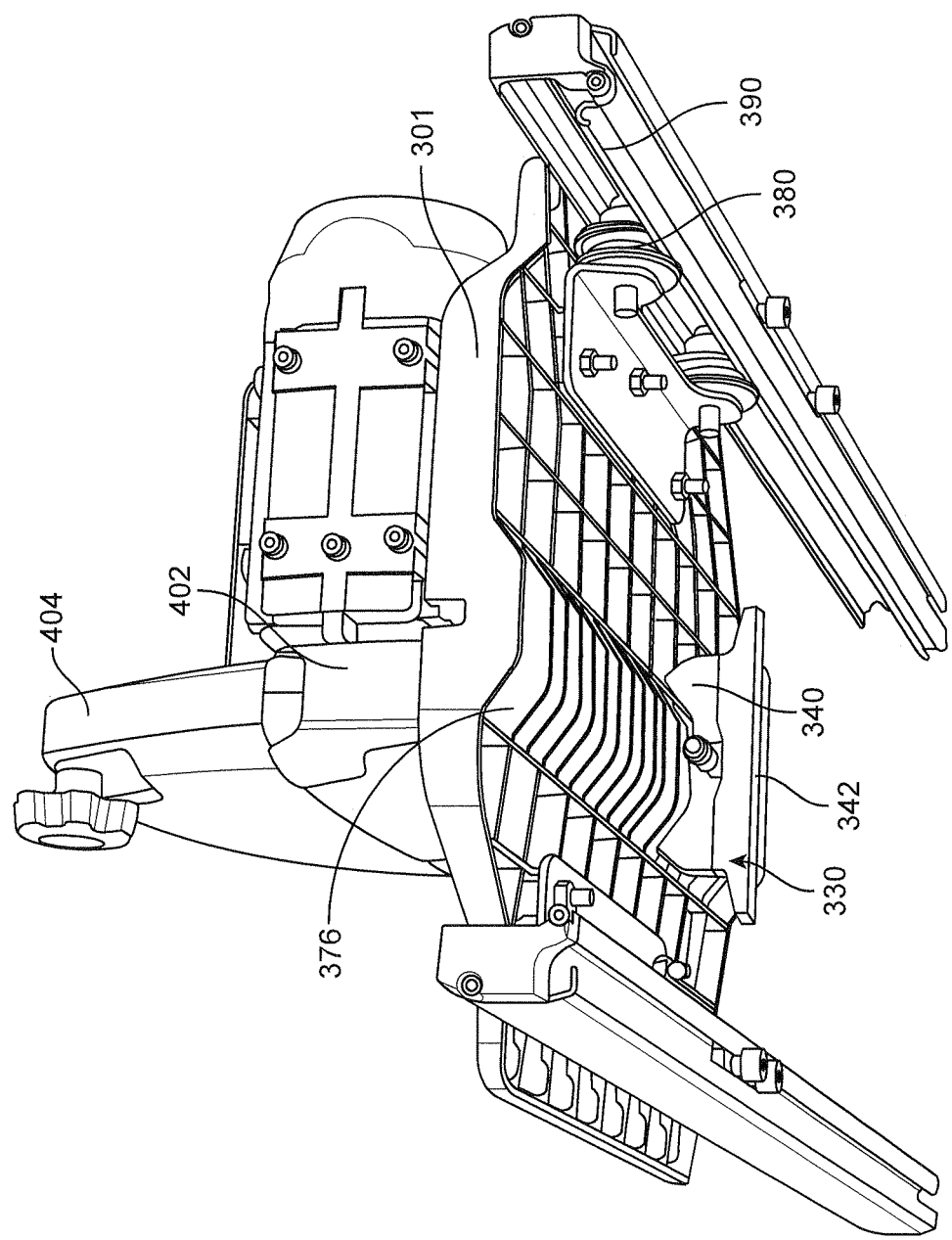
FIG. 28 is a bottom perspective view of the saw, water nozzle and work-piece platform in accordance with an exemplary embodiment

FIG. 28 illustrates a bottom perspective view of the saw. An example of the cross-member portions 376 is illustrated. The cross-member portions 376 extend downwardly thereby providing additional cross-sectional area to provide increased rigidity. As seen in FIG. 28, the work-piece platform 301 can include a plurality of wheels 380 that are mounted on a track 390. In other implementations, other mechanisms that allow the work-piece platform 301 traverse in a linear direction are considered within the scope of this disclosure. Furthermore, the mechanisms need not move the work-piece platform in a linear direction.

The present disclosure also contemplates making a product by one the above described methods. Additionally, other steps can be implemented as would be apparent from the present disclosure.

With the cutting machine described above, liquid lubricant or coolant is contained directed into the main channel and directed to contact the cutting blade, thereby efficiently cooling and lubricating the cutting blade, while minimizing overspray, debris build-up, and wasted liquid.

What is claimed is:
1. A work-piece platform comprising:
an upper surface to support a work-piece that is to be cut;
a main channel defining a first recess in the upper surface, the main channel including a bottom opposite the upper surface, a first lateral side, and second lateral side opposite the first lateral side, wherein the main channel is configured to receive a perimeter of a cutting blade;
a manifold defining a second recess in the upper surface;
at least one liquid lubrication inlet disposed in the first lateral side or the second lateral side of the main channel and fluidly connecting the main channel to the manifold, the at least one liquid lubrication inlet having a discharge opening into the main channel to discharge lubricant from the manifold into the main channel, the at least one liquid lubrication inlet being disposed at an angle having a directional component parallel to the main channel to contribute to a flow of the lubricant in a direction toward a downstream end of the main channel; and at least one outlet disposed at the downstream end of the main channel, the at least one outlet comprising a mouth, the mouth being disposed at a depth in the at least one of the first lateral side or the second lateral side of the main channel that causes a predetermined level of the lubricant to remain in the main channel.

2. The work-piece platform as recited in claim 1, wherein the at least one liquid lubrication inlet comprises a plurality of liquid lubrication inlets.

3. The work-piece platform as recited in claim 1, wherein the at least one liquid lubrication inlet comprises a plurality of liquid lubrication inlets which are spaced equidistant along a length of the main channel.

4. The work-piece platform as recited in claim 1, wherein the manifold is located on a side of the main channel.

5. The work-piece platform as recited in claim 1, wherein the at least one liquid lubrication inlet has an inlet end and is tapered from the inlet end to the discharge opening.

6. The work-piece platform as recited in claim 1, wherein the at least one liquid lubrication inlet comprises a plurality of liquid lubrication inlets having at least one liquid lubrication inlet on the first lateral side of the main channel and at least one liquid lubrication inlet on the second lateral side of the main channel with at least one discharge opening of the liquid lubrication inlets opening into the main channel.

7. The work-piece platform as recited in claim 1, wherein the discharge opening is located at a first end of the main channel and is configured to discharge lubricant in a direction away from the first end of the main channel.

8. The work-piece platform as recited in claim 1, wherein the at least one outlet terminates at a drain that is located adjacent to the first lateral side or the second lateral side of the main channel and at a predetermined distance from the first lateral side or the second lateral side.

9. The work-piece platform as recited in claim 1, wherein the at least one outlet extends downwardly from a brim of the main channel away from the upper surface.

10. The work-piece platform as recited in claim 1, wherein the at least one outlet comprises a plurality of outlets, each having a respective mouth, the respective mouths being serially spaced apart lengthwise along the main channel.

11. The work-piece platform as recited in claim 1, wherein the at least one outlet is oriented at an outlet angle to a longitudinal axis of the main channel.

12. The work-piece platform as recited in claim 11, wherein the at least one outlet is angled towards the lengthwise direction of flow of discharged lubricant in the main channel.

13. The work-piece platform as recited in claim 11, wherein the outlet angle is ninety degrees to the longitudinal axis.

14. The work-piece platform as recited in claim 11, wherein the outlet angle is an acute angle clockwise from the longitudinal axis, whereby excess discharged lubricant flows in the same lengthwise direction of flow of the lubricant in the main channel.

15. The work-piece platform as recited in claim 1, further comprising an orifice in fluid communication with the at least one outlet.

16. A method for supplying cutting fluid to a cutting machine, said method comprising:

providing a work-piece platform to support a work-piece, the work-piece platform comprising:

an upper surface to support a work-piece that is to be cut;

a main channel defining a first recess in the upper surface, the main channel including a bottom opposite the upper surface, a first lateral side, and second lateral side opposite the first lateral side, wherein the main channel is configured to receive a perimeter of a cutting blade;

a manifold defining a second recess in the upper surface;

at least one liquid lubrication inlet disposed in the first lateral side or the second lateral side of the main channel and fluidly connecting the main channel to the manifold, the at least one liquid lubrication inlet having a discharge opening into the main channel to discharge lubricant from the manifold into the main channel, the at least one liquid lubrication inlet being disposed at an angle having a directional component parallel to the main channel to contribute to a flow of the lubricant in a direction toward a downstream end of the main channel; and at least one outlet disposed at the downstream end of the main channel, the at least one outlet comprising a mouth, the mouth being disposed at depth in the at least one of the first lateral side or the second lateral side of the main channel that causes a predetermined level of the lubricant to remain in the main channel;

discharging liquid lubrication from the at least one liquid lubrication inlet at a velocity to at least one outlet; and maintaining the liquid lubrication in the main channel at the predetermined level.

17. The method as recited in claim 16, further comprising:
discharging liquid lubrication through the manifold fluidly connected to the discharge opening within the main channel.

18. The method as recited in claim 16, further comprising:
discharging liquid lubrication through a plurality of liquid lubrication inlets within the main channel.

19. An apparatus comprising:
a cutting machine;
an upper surface for supporting a work-piece thereupon to be cut by the cutting machine;
a main channel defining a first recess in the upper surface, the main channel including a bottom opposite the upper surface, a first lateral side, and second lateral side opposite the first lateral side, wherein the main channel is configured to receive a perimeter of a cutting blade;
a manifold defining a second recess in the upper surface;
at least one liquid lubrication inlet disposed in the first lateral side or the second lateral side of the main channel and fluidly connecting the main channel to the manifold, the at least one liquid lubrication inlet having a discharge opening into the main channel to discharge lubricant from the manifold into the main channel, the at least one liquid lubrication inlet being disposed at an angle having a directional component parallel to the main channel to contribute to a flow of the lubricant in a direction toward a downstream end of the main channel; and
at least one outlet disposed at the downstream end of the main channel, the at least one outlet comprising a mouth, the mouth being disposed at depth in the at least one of the first lateral side or the second lateral side of the main channel that causes a predetermined level of the lubricant to remain in the main channel.

* * * * *